United States Patent

Itou et al.

[11] Patent Number: 5,816,643
[45] Date of Patent: Oct. 6, 1998

[54] CHARGE COUPLING FOR ELECTRIC VEHICLE

[75] Inventors: Hikaru Itou; Sho Miyazaki; Tsutomu Tanaka; Masashi Saito; Shinichi Yamada; Shigekazu Wakata; Eiji Saijo, all of Yokkaichi, Japan

[73] Assignee: Sumitomo Wiring Systems, Ltd., Japan

[21] Appl. No.: 863,331

[22] Filed: May 27, 1997

Related U.S. Application Data

[60] Continuation of Ser. No. 446,457, May 22, 1995, abandoned, which is a division of Ser. No. 273,211, Jul. 11, 1994, Pat. No. 5,458,496.

[30] Foreign Application Priority Data

| Jul. 12, 1993 | [JP] | Japan | 5-195443 |
| Jul. 14, 1993 | [JP] | Japan | 5-197862 |
| Jul. 15, 1993 | [JP] | Japan | 5-198957 |
| Aug. 18, 1993 | [JP] | Japan | 5-226472 |
| Aug. 20, 1993 | [JP] | Japan | 5-228038 |
| Aug. 31, 1993 | [JP] | Japan | 5-240447 |
| Sep. 20, 1993 | [JP] | Japan | 5-257650 |

[51] Int. Cl.⁶ .............................. B60R 27/00; H02J 7/00
[52] U.S. Cl. ...................... 296/97.02; 439/310; 439/34
[58] Field of Search ................ 296/97.02; 439/310, 439/34

[56] References Cited

U.S. PATENT DOCUMENTS

| 4,142,756 | 3/1979 | Henning et al. | 296/97.22 |
| 5,090,760 | 2/1992 | Wheeler | 296/97.22 X |
| 5,385,480 | 1/1995 | Hoffman | 439/310 |
| 5,401,174 | 3/1995 | Hansen | 439/34 |
| 5,458,496 | 10/1995 | Itou et al. | 439/34 |

FOREIGN PATENT DOCUMENTS

| 0001026 | 1/1985 | Japan | 296/97.22 |
| 0082823 | 4/1988 | Japan | 296/97.22 |
| 0065485 | 3/1991 | Japan | 296/97.22 |
| 002240096 | 7/1991 | United Kingdom | 296/97.22 |
| 002278509 | 11/1994 | United Kingdom | 439/34 |

*Primary Examiner*—Joseph D. Pape
*Attorney, Agent, or Firm*—Jordan B. Bierman; Bierman, Muserlian and Lucas

[57] ABSTRACT

A charge coupling for an electrical vehicle wherein conduction is enabled from a charger to a battery on the electrical vehicle when a supply connector connected to power a source is completely fitted to a vehicle inlet installed in the electric vehicle, this charge coupling including a locking device for temporarily locking the supply connector to the vehicle inlet at a half fitting position, the electric vehicle being provided, on its body, with an accommodating chamber outwardly open to expose the vehicle inlet, the accommodating chamber being provided on its interior with a draining mechanism, including inclined walls.

13 Claims, 28 Drawing Sheets

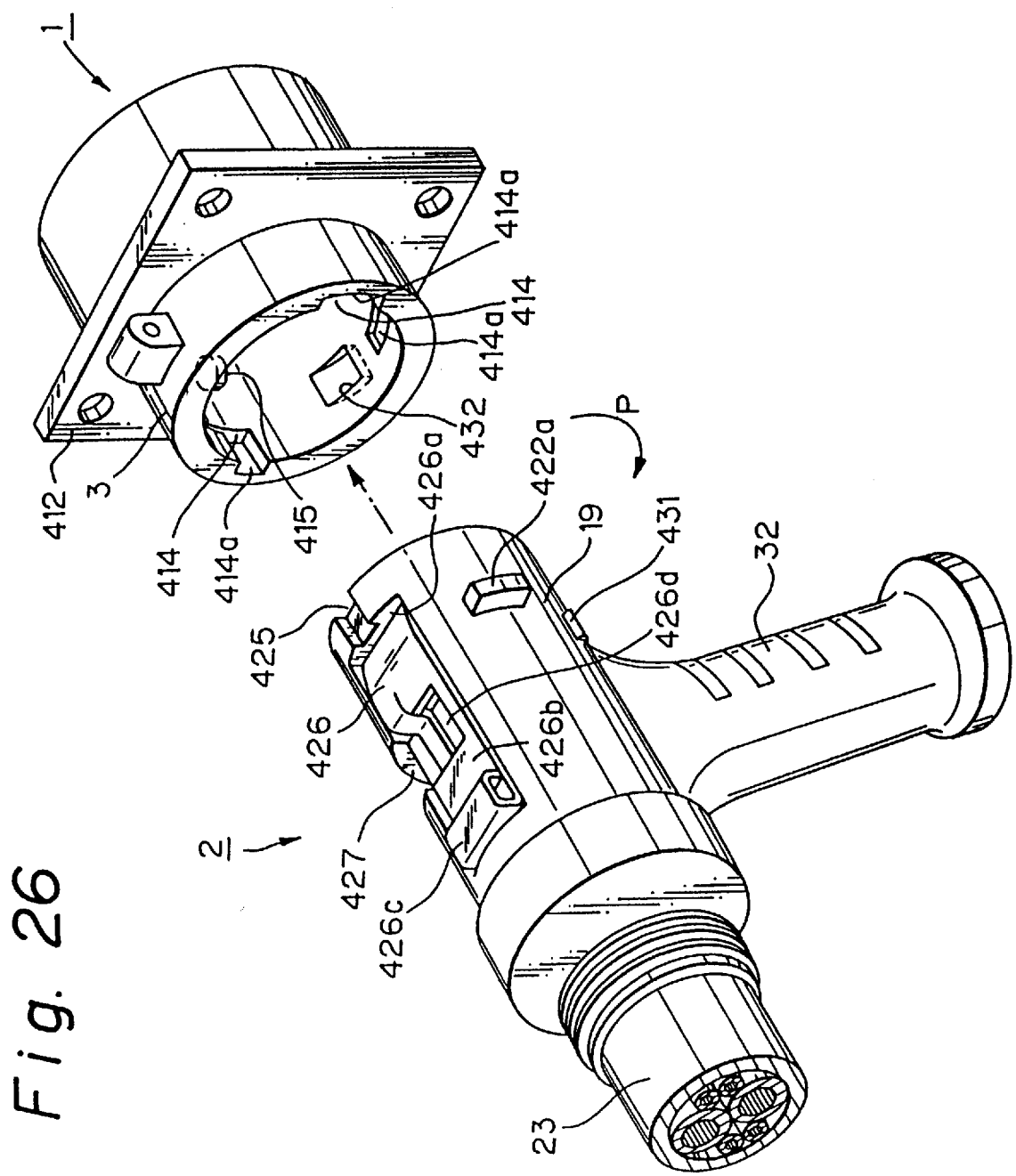

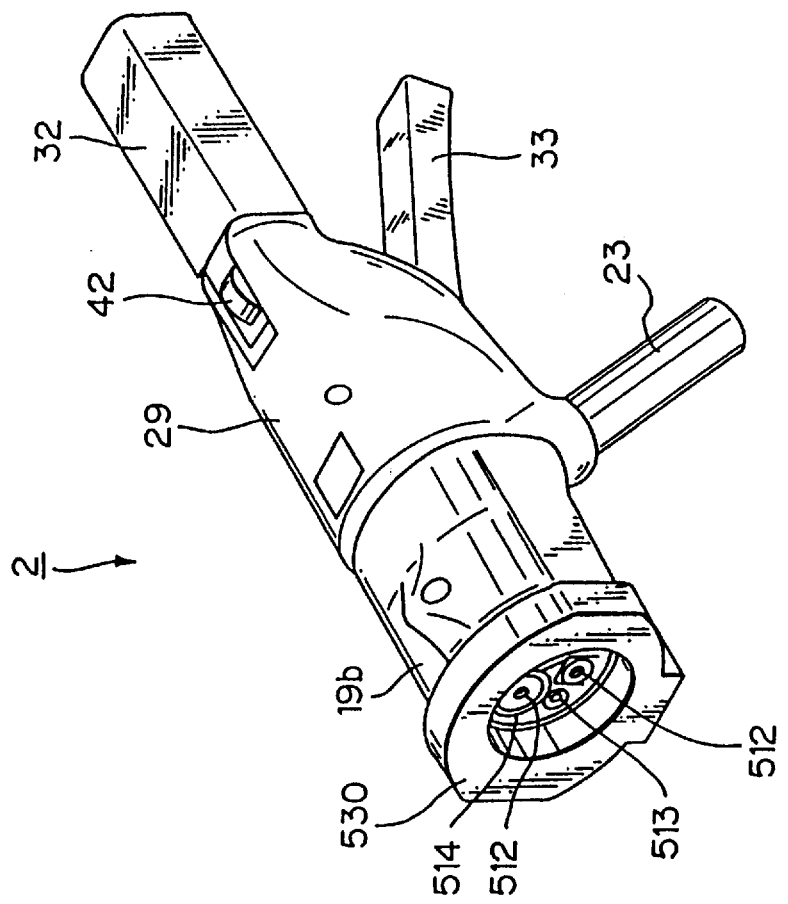
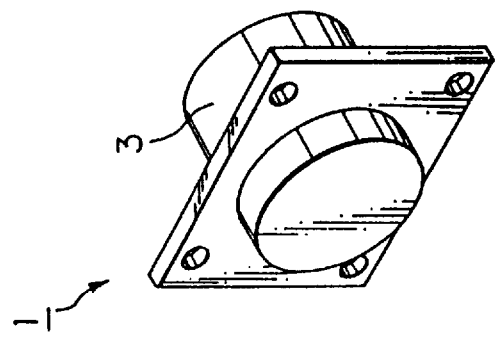
Fig. 29

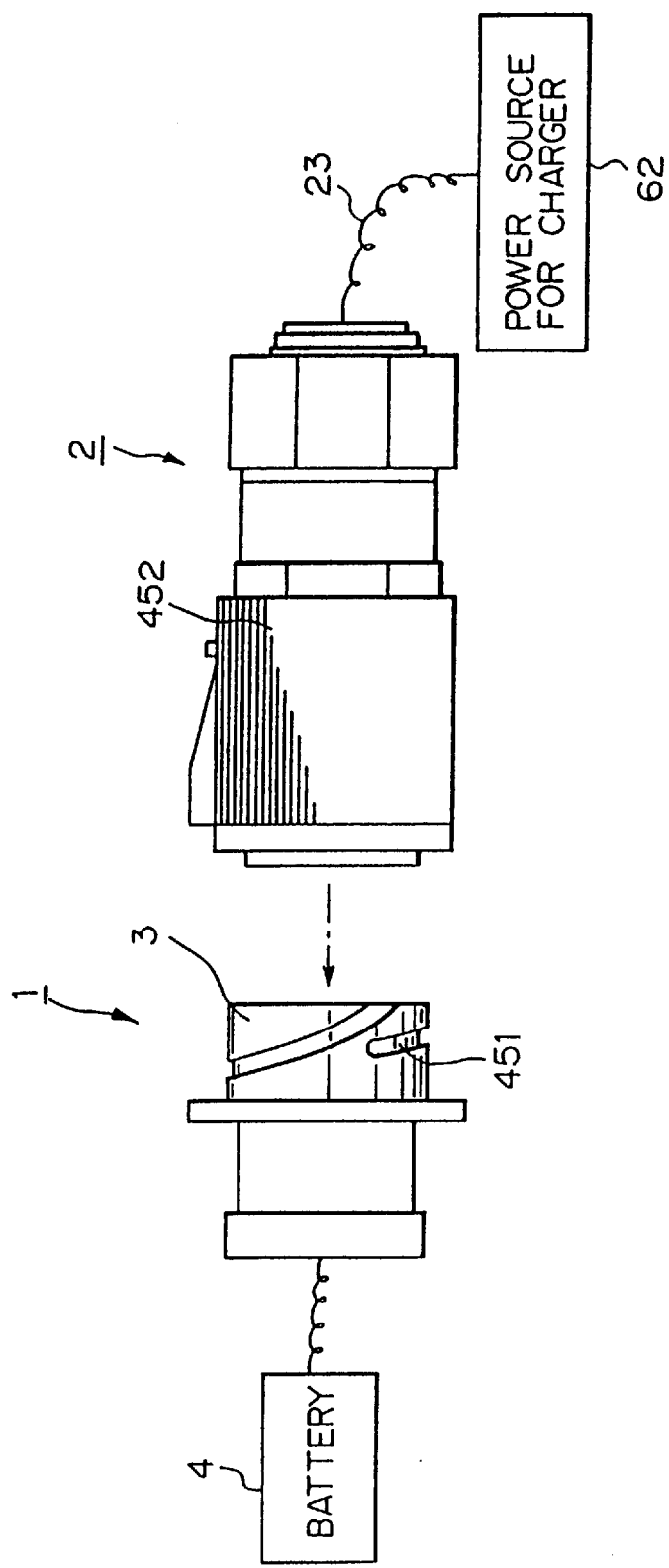

CHARGE COUPLING FOR ELECTRIC VEHICLE

This application is a continuation of application Ser. No. 08/446,457, filed May 22, 1995, now abandoned, which is a division of 273,211, filed Jul. 11, 1994, now U.S. Pat. No. 5,458,496.

BACKGROUND OF THE INVENTION:

1. Field of the Invention

This invention relates to a charge coupling for an electric vehicle.

2. Statement of the Prior Art

Electric vehicles will find increasing use in the near future in view of environmental and energy concerns. As such, the problem of a battery charging must be overcome. In particular, a coupling for charging raises an important problem. A charge coupling includes a vehicle inlet or a vehicle connector installed in an electric vehicle and a supply connector or a power source connector connected to a power source on the ground. Charging work is carried out under relatively high voltages. Accordingly, conduction should be commenced after a supply connector has been completely fitted to a vehicle inlet.

In actual charging work, an operator holds the supply connector and pushes it into the vehicle inlet. In this case, the operator can not confirm whether or not the supply connector is completely fitted to the vehicle inlet, from such an operation. If the operator can not visually determine incomplete fitting of the coupling, he can not confirm whether or not the coupling is in a suitable conduction state.

An opening of the vehicle inlet opens outwardly only when charging and otherwise is closed. If such closing is incomplete, water-proofing, dust-proofing and the like can not be effected properly. Accordingly, this is one of most important problems. Heretofore, a lid is rotatably attached to a vehicle inlet and is biased to a closed position by a spring so that the lid is closed under a state exclusive of a charging.

However, such a biasing force exerted by the spring can not positively lock the lid in the closed position. For example, the closed lid can be readily opened by an external force.

Even if the lid is pushed onto a rubber packing on the vehicle inlet, which serves to seal a clearance between the lid and inlet, by a spring biasing force, the lid is occasionally left half open.

Since the lid is closed by the spring biasing force when the external force is removed regardless of the operator's will, substances lodge between the vehicle inlet and the lid thereby resulting in incomplete closing.

Accordingly, it is very difficult to keep the lid in the complete closed position and to enhance reliability of the lid only by means of the spring biasing force.

It is necessary to prevent the coupling from leaking current and shorting a circuit due to rainwater between terminals upon charging on a rainy day. Thus, the supply connector is provided with a lid for closure upon non-charging and a rubber ring or the like is mounted on a mating portion of the coupling upon charging in order to prevent rainwater from entering into the mating portion.

In the prior art, water-proofing of the supply connector was effected by fitting a lid thereon and providing a mating portion of the coupling with a rubber ring after fitting.

However, upon charging, terminals in an end of the supply connector are exposed by opening the lid before the supply connector is fitted to the vehicle inlet. Also, rainwater may adhere to the exposed fitting face thereby causing leakage or short-circuiting between the terminals.

For convenience of explanation, terminals to be utilized in a conventional coupling will be explained below by referring to FIG. 33. FIG. 33 is a fragmentary longitudinal sectional view of a conventional supply connector.

As shown in FIG. 33, in the conventional coupling, a cavity 302 is formed in an inner housing 19a. The cavity 302 has an insertion port 303 for a terminal 310 at an end, a connector port 304 for a mating connector not shown at the other end, and a stopper 307 at a middle. The terminal 310 inserted in the cavity 302 is provided in its front end with a connection portion 311 for a mating terminal not shown and connected at its rear end to a cable 312 extending to a power source for charging. A cylindrical retainer 315 is mounted on the terminal 310. The retainer 315 is provided on its given positions with a lance 316 which can deflect elastically.

Upon inserting the terminal 310 into the cavity 302, the terminal 310 is inserted from the rear insertion port 303 through the middle portion to the front connection port 304. When the lance 316 of the retainer 315 is passing on the stopper 307, the lances 316 are deformed elastically and when it pass over the stopper 307, it recovers elastically to engage with a front edge of the stopper 307. At the same time, a shoulder 317 of the terminal 310 engages with a rear edge of the stopper 307. Then, the front end 311 of the terminal 310 is disposed in the connection port 304 of the cavity 302. At this time, insertion work is complete.

It is necessary to form a clearance corresponding to a height of the stopper 307 between the cavity 302 and the terminal 310 at an area from the front edge of the stopper 307 to the insertion port 304. The clearance induces a center gap in the terminal in the cavity 302. This center gap occurs if the cable 312 is bent or if an external force is applied to the terminal 310 in a direction perpendicular to the axis of the terminal 310, since the lance 316 is deformed elastically. Thus, the center gap impedes insertion of the mating terminal and will break the terminal 310 if the mating terminal is forced to be inserted into it.

In order to overcome this problem, the cavity 302 is formed into a rectangular shape in cross section and the terminal 310 is also formed into a corresponding rectangular shape in cross section. Such a rectangular shaped cross section enables both terminals to be centered but allows play in only one direction in which the stopper 307 is provided.

However, insertion work of the terminal 310 is troublesome since the terminal 310 must be inserted into the cavity 302 so that the lance 316 is directed to the stopper 307 in the cavity 302. Recently, a non-directive insertion method is required for terminals. Consequently, the terminal 310 and cavity 302 are formed into a circular shape in cross section and the stopper 307 is formed into an annular ridge to engage with the lance 316 in any circumferential direction. Although insertion can be effected smoothly, some problems will occur upon connecting of the mating connector, since a clearance is defined around the entire periphery of the connector portion of the terminal 310.

Further, for convenience of explanation, a connecting example of a conventional coupling will be described below by referring to FIG. 34. FIG. 34 is a explanatory view of a conventional charge coupling.

In FIG. 34, a vehicle inlet 1 is connected to a battery 4 and a supply connector 2 is connected through a flexible cable 23 to a charger 62. A distal end of the supply connector 2 is formed into a shape suitable for fitting into an inlet housing or guide cylinder 3. When they are interconnected, terminals in the inlet 1 and connector 2 are interconnected to be electrically conducted. In order to assist such fitting, the inlet housing 3 is provided on its outer periphery with spiral grooves 451 and a rotatable sleeve 452 mounted on the distal end of the supply connector 2 is provided on its inner periphery with pins engageable with the spiral grooves 451. Upon connecting the coupling, an operator holds the supply connector 2 with one hand so that the pins are engaged with the open ends of the spiral grooves 451 and rotates the sleeve 452 with his other hand. Then, the pins are guided by the spiral grooves 451 to advance the sleeve 452 and thus the supply connector 2 toward the vehicle inlet 1, thereby fitting the coupling.

However, a conventional coupling operation requires both hands to be used since one hand holds the supply connector 2 and the other hand rotates the sleeve 452. Thus, work efficiency is lowered.

In order to engage the pins of the sleeve 452 with the spiral grooves 451 to connect the coupling, the sleeve must be rotated by about one turn not-withstanding a slippery surface of the sleeve 452. This extends work time and lowers efficiency.

Since the outer periphery of the distal end of the supply connector is made of a metal material, it may injure a vehicle body if it contacts it by mistake.

Also, if the supply connector falls on the ground by mistake, it will be deformed at its distal end.

For convenience of explanation, means for draining water in an accommodating chamber which is provided in the vehicle body to accommodate the vehicle inlet will be described by referring to FIG. 35. FIG. 35 is a longitudinal sectional view of a conventional vehicle inlet. As shown in FIG. 35, an accommodating chamber 602 mounted on a vehicle body 200 is provided in its interior with a draining port 611. Water adhering to the interior of the chamber 602 flows down on the interior and is drained from the port 611 outside the chamber 602. In this construction, an inner wall 604 and opposite side walls 608 standing vertically in the accommodating chamber 602 will allow water to drain. However, since a ceiling wall 606 and a floor wall 607 are arranged horizontally, water adhering to the ceiling wall 606 does not flow to the inner wall 604 or side walls 608 and falls down directly on the floor wall 607, thereby wetting the vehicle inlet 1. On the other hand, water on the floor wall will be collected in an inner corner when the body is inclined on running, thereby wetting the vehicle inlet. Thus, since the vehicle inlet is readily wetted, exposed terminals in the vehicle inlet contact with water thereby causing leakage and short circuit.

SUMMARY OF THE INVENTION

A first object of the present invention is to provide a charge coupling for an electric vehicle in which an incomplete fitting state of a supply connector in a vehicle inlet can be easily detected.

A second object of the present invention is to provide a charge coupling for an electric vehicle in which a flap lid of a vehicle inlet can be positively locked.

A third object of the present invention is to provide a charge coupling for an electric vehicle which can prevent a fitting face from leaking a current and short circuiting due to water prior to fitting.

A fourth object of the present invention is to provide a charge coupling for an electric vehicle which can positively position terminals.

A fifth object of the present invention is to provide a charge coupling for an electric vehicle which can enhance a working operation and a working efficiency upon connecting.

A sixth object of the present invention is to provide a charge coupling for an electric vehicle which can protect a vehicle body upon fitting a supply connector to a vehicle inlet and protect the supply connector from damage.

A seventh object of the present invention is to provide a charge coupling for an electric vehicle which can prevent a vehicle inlet from leaking a current and short circuiting due to water upon connecting.

In order to achieve the above objects, a basic construction of a charge coupling for an electric vehicle in accordance with the present invention, wherein conduction is enabled from a power source on the ground to a battery on the electric vehicle when a supply connector connected to said power source is completely fitted to a vehicle inlet installed in the electric vehicle, comprises: means for temporarily locking said supply connector to said vehicle inlet at a half fitting position.

In order to achieve the first object, a charge coupling for an electric vehicle in accordance with the present invention, further comprises: means for biasing said supply connector toward a returned position when said supply connector is inserted into said vehicle inlet, said locking means being adapted to temporarily maintaining said supply connector at said half fitting position when said supply connector is returned by said biasing means.

The locking means are provided on a lower and inner part of a housing of said vehicle inlet with a ridge extending axially. The ridge is fitted in an engaging groove in the supply connector to guide the supply connector upon inserting said connector into said vehicle inlet. Said ridge is provided on its opposite longitudinal sides with guide slots which engage with plunger balls received in said supply connector. The guide slots are provided with recesses in their middle portions which are disposed at the incomplete fitting position on which the supply connector is temporarily locked to the vehicle inlet. The biasing means include a double cylindrical housing having an inner housing and an outer housing and a compression coil spring disposed in a clearance between the inner and outer housing so that an end of the coil spring elastically contact with an opening edge of the vehicle inlet.

According to the above construction, when the supply connector is completely fitted to the vehicle inlet, a conduction is allowed. However, if an inserting operation of the supply connector is stopped prior to the complete fitting position, the supply connector is returned by the biasing means and is temporarily maintained at the half fitting position by the locking means. Accordingly, if a complete fitting state is not obtained in the coupling, the supply connector is separated from the vehicle inlet to the half fitting position.

When the supply connector does not reach the complete fitting position, it is returned to the half fitting position and is not electrically connected to the vehicle inlet. An operator can easily determine that the supply connector has not reached the complete fitting position.

Also, if the coupling is in an incomplete fitting state, the supply connector is returned to the half fitting position by the biasing means and is maintained at the half fitting position by the locking means, thereby preventing the supply connector from falling down from the vehicle inlet.

In order to achieve the second object, a charge coupling for an electric vehicle in accordance with the present invention, further comprises: a flap lid mechanism including a flap lid swingably mounted on an opening end of said vehicle inlet, an elastic member for biasing said flap lid toward an opened position, and means for latching said flap lid at a closed position on the opening end.

According to the above construction, the flap lid which is biased to the opened position by the elastic member is locked at the closed position on the opening end of the vehicle inlet by the latching means. Accordingly, the opening end of the vehicle inlet is positively sealed by the flap lid since the flap lid is locked at the complete closed position by the latching means after the flap lid is completely closed against the biasing force.

According to the present invention, it is possible to positively maintain the flap lid under a sealed state and to enhance reliability. For example, the flap lid can preferably press a rubber packing on the opening end of the vehicle inlet, thereby maintaining the flap lid at the complete closed position under a state except charging.

Also, the flap lid is not left at a half opened position since the flap lid is biased to the opened position and must be closed by the operator.

In order to achieve the third object, a charge coupling for an electric vehicle in accordance with the present invention, the supply connector is provided on its fitting face and an area between terminals with means for diverting water on the fitting face. The diverting means is a recess or a ridge formed on the fitting face to section the area between the terminals.

According to the above construction, since the diverting means is provided on the area between the terminals on the fitting face on the distal end of the vehicle inlet, even if rainwater adheres to the fitting face prior to fitting of the coupling upon charging, the diverting means increases a distance of a flow path of water between the adjacent terminals to shut off conduction due to water between the adjacent terminals. Consequently, it is possible to avoid leakage and short circuiting between the terminals.

Also, the recess or ridge for diverting water can be easily worked and increase the distance of the flow path of water between the adjacent terminals.

According to the present invention, when charging is carried out on a rainy day even if the fitting face of the vehicle inlet is wetted by rainwater prior to fitting of the coupling, it is possible to prevent leakage and short circuiting between the terminals prior to charging and during charging.

The diverting means is a simple construction and can increase the distance of the flow path of water between the terminals, thereby easily realizing the water-diverting.

In order to achieve the fourth object of the present invention, a charge coupling for an electric vehicle in accordance with the present invention, a plurality of terminals having a circular cross section are inserted into a plurality of cavities having a circular cross section and provided in the inner housing of the supply connector, respectively, wherein the terminal is provided on its outer periphery with a plurality of lances so that the lances elastically contact with an inner periphery of the cavity to hold the terminal in the cavity coaxially, and wherein a positioning member Is fitted in a connecting port of the cavity to be coupled to the vehicle inlet to enclose an end of the terminal. Each positioning member may be separately fitted in each cavity. A plurality of positioning means may be formed integrally.

According to the above construction, since the distal end of the terminals is positioned by the positioning member, the distal end of the terminal is maintained at the coaxial position with the connection port of the cavity even if any external force perpendicular to the axis of the terminal, which is exerted by bending of the cable, is applied to the terminal.

Thus, a terminal of a mating connector is fitted to the positioned distal end of the terminal.

A plurality of positioning members may be attached to the connection port of each cavity.

In the case that a plurality of positioning members are formed integrally, all members can be attached to all cavities simultaneously.

As the positioning member surely positions the distal end of the terminal at the coaxial position with the cavity, it is possible to avoid abutment of the terminal in the cavity and the mating terminal without fitting each other and to prevent a connection failure of the coupling and breakage of the terminals. The positioning members may be attached to each cavity. The integrated positioning members can enhance efficiency of attaching work.

In order to achieve the fifth object of the present invention, a charge coupling for an electric vehicle in accordance with the present invention, the supply connector is connected to a charger through a charge cable and is provided coaxially in a connector housing with supply terminals. Said vehicle inlet is installed on a vehicle body of an electric vehicle and is provided coaxially in an inlet housing with terminals adapted to be coupled to said supply terminals. The locking means are provided circumferentially on a distal end of either the vehicle inlet or the supply connector. The locking means include a spiral groove which extends from a half fitting position of said supply connector relative to said vehicle inlet to a complete fitting position of the supply connector relative to the vehicle inlet and an engageable boss which projects from a distal end of the other one of the vehicle inlet and supply connector and is adapted to detachably engage with said spiral groove. The supply connector is provided on its outer periphery with a handle which assists the supply connector in rotating so that the engageable boss moves in said spiral groove from a beginning end to a terminating end and vice versa. Holding means are provided on either the vehicle inlet or the supply connector and serve to maintain the supply connector at the complete fitting position in the vehicle inlet when the engageable boss reaches the terminating end of the spiral groove.

Upon fitting the coupling, an operator holds the handle by his one hand and engages the engageable boss with the beginning end of the spiral groove to bring the coupling into the half fitting state. Then the handle is rotated to turn the supply connector and to move the engageable boss in the spiral groove. When the engageable boss reaches the terminating end of the spiral groove, the supply connector is brought into the complete fitting position relative to the vehicle inlet. The terminals in the supply connector are arranged coaxially with the terminals in the vehicle inlet. Accordingly, both terminals are connected even if the supply connector is rotated relative to the vehicle inlet to displace the supply connector from the half fitting position to the complete fitting position.

As the handle is held and turned by one hand, it is possible to operate the coupling by one hand and to enhance an efficiency of work.

Since it is not necessary to turn a slippery sleeve, a working time is shortened and an efficiency of work is enhanced.

In order to achieve the sixth object of the present invention, a charge coupling for an electric vehicle in accordance with the present invention, an end of the supply connector is covered with a protective member. The supply connector is provided on its outer periphery of the end with an engageable portion and the protective member is made of a rubber material and formed into a crown like shape to be mounted on the engageable portion.

According to the above construction, since the distal end of a metal shell of the supply connector is covered with the protective member, even if the distal end of the supply connector hits the vehicle body by mistake upon charging, the protective member absorbs a shock and prevent the metal shell from contacting with the vehicle body directly.

It is possible to cover the distal end of the supply connector with the protective member merely by fitting the crown like rubber member to the outer periphery of the supply connector.

Even if the distal end of the supply connector hits the vehicle body by mistake when the supply connector is fitted to the vehicle inlet upon charging, the distal end does not injure the vehicle body and it is not deformed even if the supply connector falls on the ground by mistake.

It is possible to easily attach the crown like rubber protective member to the distal end of the supply connector without using a special attaching means.

In order to achieve the seventh object of the present invention, a charge coupling for an electric vehicle in accordance with the present invention, the electric vehicle is provided on its body with an accommodating chamber which is open outwardly to expose said vehicle inlet. The accommodating chamber is provided on its interior with a draining mechanism including inclined walls. The interior of the accommodating chamber may be covered with a water-repelling layer. The accommodating chamber may be provided on its interior with a water collection groove. The accommodating chamber may be provided with a draining port in the vicinity of an opening edge. A cover attached to an opening of the accommodating chamber may be provided with a heater which heats the interior of the chamber.

Since the ceiling wall is inclined down toward the inner wall or the side wall, water adhering to the ceiling wall will flow on the ceiling wall toward the inner wall or the side wall without falling on the vehicle inlet in the accommodating chamber.

Also, since the floor wall is inclined down toward the opening edge of the accommodating chamber, water on the floor wall flows on the wall toward the opening edge without being collected on the inner corner of the accommodating chamber even if the vehicle body is inclined.

Also, since the accommodating chamber is provided on its interior with the water-repelling layer, water flows smoothly. Since the accommodating chamber is provided on its interior with the water collection groove, water on the interior will be collected in the groove without flowing on the vehicle inlet. Since the chamber is provided with the draining port in the vicinity of the opening edge, water does not flow out of the opening edge. Since the cover attached to the opening of the chamber is provided with the heater, heater heats the interior of the chamber, thereby evaporating water in the chamber.

Since water in the chamber does not wet the vehicle inlet, it is possible to prevent leakage and short circuiting.

BRIEF DESCRIPTION OF THE DRAWINGS

FIG. 26 is a perspective view of another embodiment of the charge coupling for an electric vehicle in accordance with the present invention, illustrating a supply connector separated from a vehicle inlet;

FIG. 29 is a perspective view of another embodiment of the coupling in accordance with the present invention, illustrating the supply connector separated from the vehicle inlet;

FIG. 34 is an explanatory view of a conventional charge coupling; and

DETAILED DESCRIPTION OF THE PREFERRED EMBODIMENTS

Figure 1:
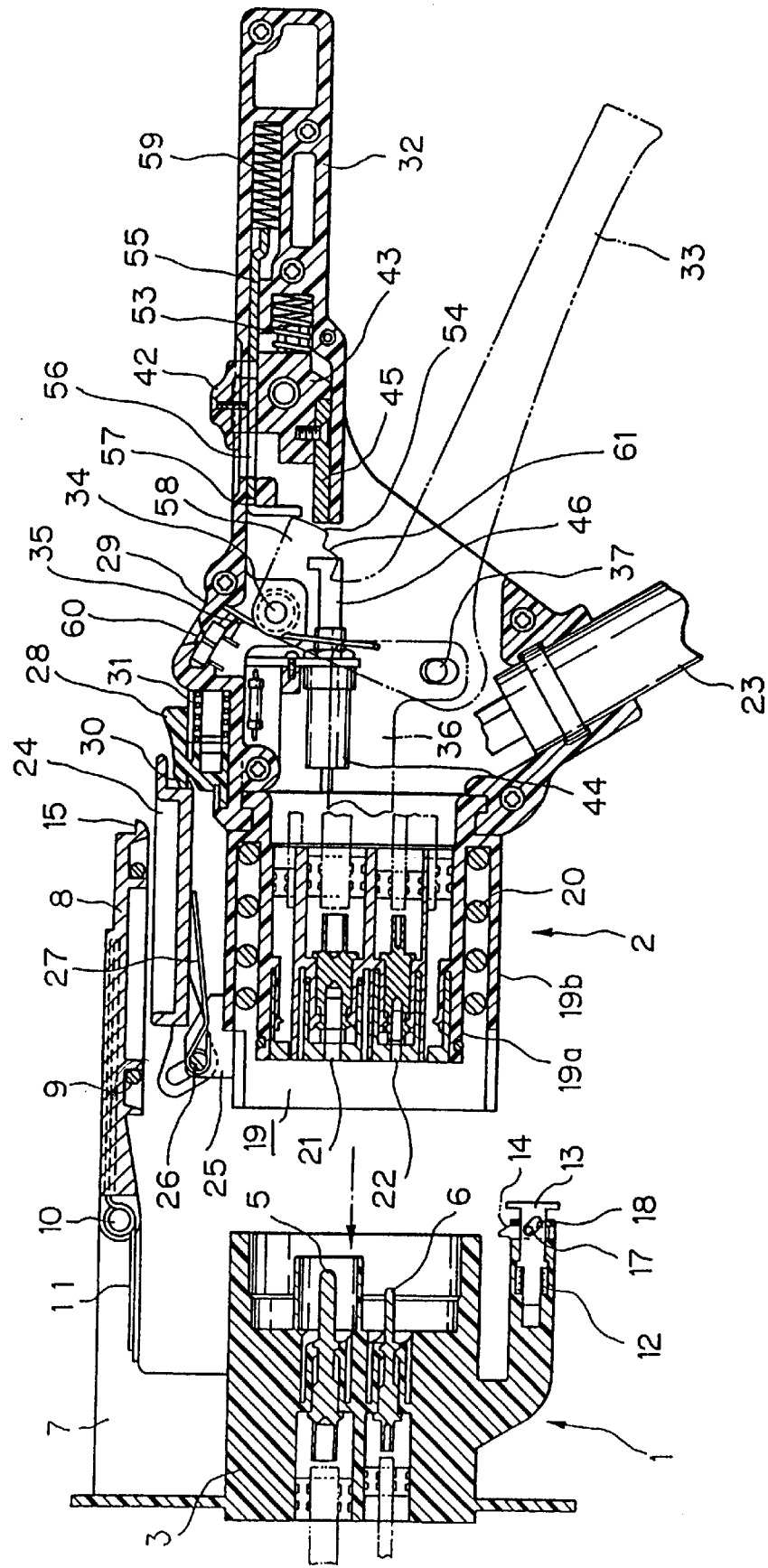
FIG. 1 is a longitudinal sectional view of a charge coupling for an electric vehicle in accordance with the present invention, illustrating the coupling under a state prior to fitting.

Embodiments of a charge coupling for an electric vehicle in accordance with the present invention will be described below by referring to FIGS. 1 to 4. A charge coupling includes a vehicle inlet 1 and a supply connector 2. The vehicle inlet 1 is provided with a cylindrical inlet housing 3 which accommodates charge terminals 5 connected to a battery 4 (see FIG. 3) in a vehicle and signal terminals 6 for detecting a charging condition. The inlet housing 3 is provided on a bracket 7 on a top face with a flap lid 8, which detachably covers an opening of the inlet housing 3 and seals an interior of the housing 3 by a seal ring 9 mounted on an inner face of the flap lid 8. A torsion spring 11 is mounted on a supply axle 10 to bias the flap lid 8 toward an opened position. However, the flap lid 8 is provided with a stopper (not shown) which limits an angular displacement of the flap lid 8 at an angle perpendicular to the inlet housing 3.

Figure 5:
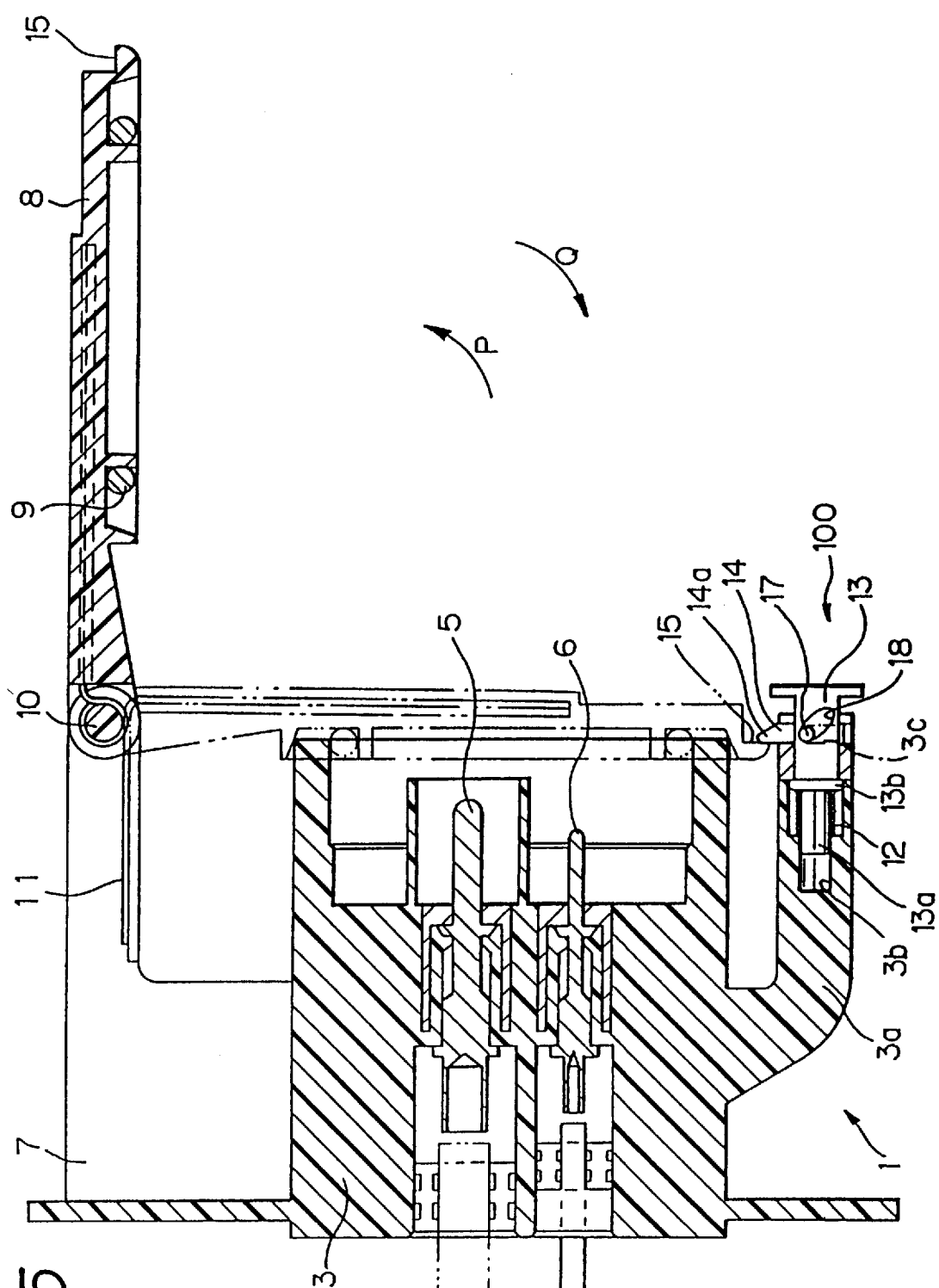
FIG. 5 is a longitudinal sectional view of a vehicle inlet of the coupling, illustrating an embodiment of a locking mechanism of a flap lid.
Figure 6:
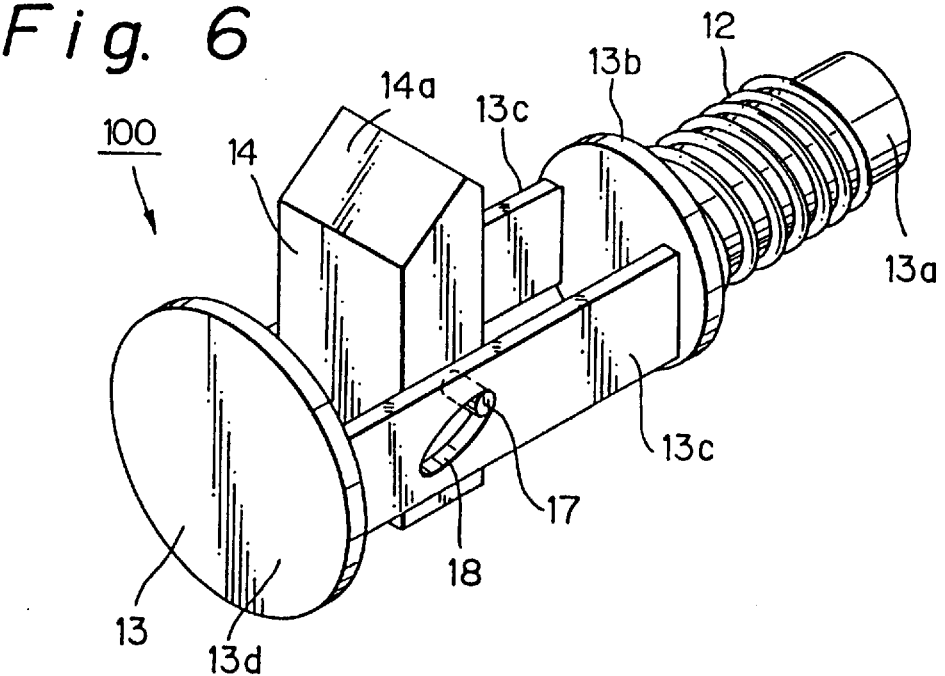
FIG. 6 is a perspective view of the locking mechanism shown in FIG. 5.

Next, a locking mechanism for a flap lid 6 will be explained below by referring to FIGS. 5 and 6. The inlet housing 3 is provided on its lower portion with a jaw 3a having a hole 3b in a front end. A locking means 100 is received in the hole 3b. The locking means 100 includes a stopper member 14 which maintains the flap lid 8 at a closed position and an operation member 13 which releases the stopper member 14, The operation member 13 has an axle 13a slidably inserted in the hole 3b. The axle 13a is provided on its end with a flange 13b which serves to prevent the axle 13a from coming out of the hole 3b. A compression coil spring 12 is inserted in the hole 3b on the inner side from the flange 13b to bias the operation member 13 and the locking means outwardly. A pair of connecting pieces 13c extend from the flange 13b to a push disk 13d.

The stopper member 14 is provided on its upper part with a pawl 14a which detachably engages with a pawl 15 of the flap lid 15. The stopper member 14 is received between the connecting pieces 13c and provided on opposite sides with bosses 17 which engage with cam slots formed in the connecting pieces 13c. The cam slots are formed so that the stopper member 14 is moved up or down by pushing the operation axle 13 or by returning the axle 13 by the spring 12. Further, the jaw 3a is provided on its distal end with a guide slot 3c in which the stopper member 14 slides up and down.

Next, an operation of the above embodiment will be explained below.

In the case of charging a battery in the vehicle, the flap lid is released to be open. That is, the operation member is pushed, the cam slot 18 lowers the boss 17, and the stopper member 14 releases the pawl 15. Then, the flap lid 8 is rotated in a direction shown by an arrow P in FIG. 5 since it is normally biased toward the open position by the torsion spring 11. The flap lid 8 is stopped at a position shown by solid lines in FIG. 5 by a stopper not shown. Since the opening of the inlet housing 3 is released, the supply connector not shown can approach the vehicle inlet to effect charging.

During non-charging, the flap lid is in the closed state. An external force is applied to the flap lid 8 against the biasing force of the torsion spring 11 to rotate the lid 8 in a direction shown by an arrow Q in FIG. 5. When the flap lid 8 contacts with the opening edge of the inlet housing 3 to close it (shown by broken lines in FIG. 5), the pawl 15 of the flap lid 8 engages with pawls 14a of the stopper member 14, thereby locking the flap lid 8 at its closed position. It is possible to effect waterproofing, and dustproofing of the charging terminals 5 and signal terminals 6, since the opening of the inlet housing 3 is closed.

According to the present embodiment, the flap lid 8 which covers the opening of the inlet housing 3 of the vehicle inlet 1 can be positively held in the closed lid state by the locking means 100, thereby enhancing reliability of closing and holding the flap lid.

By this locking means 100, the seal ring 7 for waterproofing disposed between the flap lid 8 and the inlet housing 3 can be surely pressed, the flap lid 8 can be always held in the closed lid state on a non-charging time, and waterproofing and dustproofing for the charge terminals 5 and signal terminals 6 accommodated in the inlet housing 3.

Since the flap lid 8 is biased to the opening direction by the torsion spring 11, the flap lid 8 must be closed by an external force, thereby eliminating the problem of the flap lid 8 being left half open.

Further, the locking means 100 is actuated to open the flap lid 8 merely by pushing the push disk 13d of the operation member 13 and the flap lid 8 is closed by engaging the pawl 15 with the pawl 14a of the stopper member 14. Thus, the flap lid 8 can be very easily opened and closed, thereby enhancing an efficiency of work. Enabling the flap lid to be operated with one hand is particularly useful.

In the above embodiment, the locking means 100 is provided on the inlet housing 3. However, for example, the locking means may be provided on the flap lid 8 and the pawl may be provided on the inlet housing.

Also, in the above embodiment, the locking means 100 including the operation member 13 and stopper member 14 is used for locking the flap lid 8. Another locking and releasing mechanism may be used.

Figure 7:
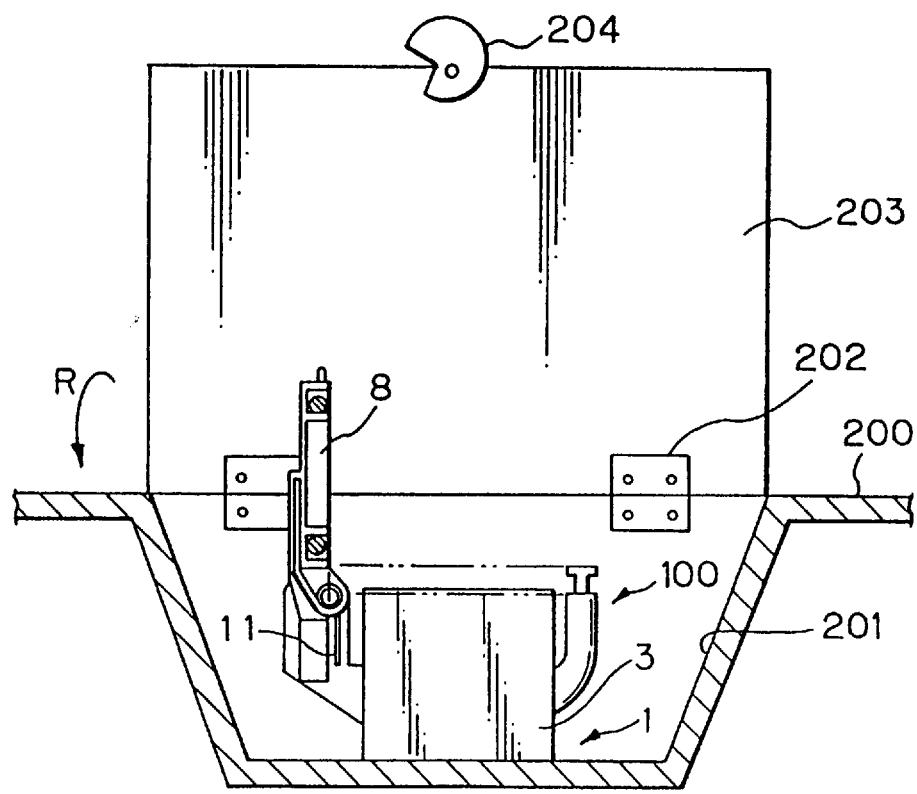
FIG. 7 is a longitudinal sectional view of another embodiment of the vehicle inlet of the coupling.

Next, another embodiment of a locking means for a flap lid in accordance with the present invention will be explained by referring to FIG. 7.

In this embodiment, the vehicle inlet 1 explained in the above embodiment is disposed in an accommodating chamber 201 provided in a vehicle body 200 of an electric vehicle.

The accommodating chamber 201 is a recess formed in the vehicle body 200. A body lid 203 is rotatably attached to the chamber 201 through hinges 202. The body lid 203 is provided with a latch 204 which engages with the vehicle body 200 when the lid 203 is closed. The rotating direction of the flap lid 8 of the vehicle inlet 1 is substantially perpendicular to that of the body lid 203.

In this embodiment, the body lid 203 is opened upon charging. Then, the flap lid 8 is opened by actuating the locking means 100. On the non-charging time, the body lid 203 is closed after the flap lid 8 has been closed.

As described above, according to this invention, the body lid 203 is not closed by the flap lid 8 when it is opened since the body lid 203 and flap lid 8 rotate in perpendicular to each other. Consequently, it is possible to detect a state leaving the flap lid 8 of the vehicle inlet 1 open, thereby enabling the flap lid 8 to be properly closed.

Next, a mechanism which temporarily locks the supply connector 2 at a half fitting position relative to the vehicle inlet 1 will be explained below by referring to FIGS. 1, 8 and 9.

The temporary locking mechanism are provided on a lower and inner part of the inlet housing 3 of the vehicle inlet 1 with a ridge 70 extending axially. The ridge 70 is fitted in an engaging groove 80 in the supply connector 2 to guide the supply connector 2 upon inserting the connector 2 into the vehicle inlet 1. The ridge 70 is provided on its opposite longitudinal sides with guide slots 74a and 74b which engage with plunger balls 84 received in the supply connector 2. The guide slots 74a and 74b are provided with recesses 72 in their middle portions which are disposed at the incomplete fitting position on which the supply connector 2 is temporarily locked to the vehicle inlet 1.

The supply connector 2 will be explained below. As shown in FIG. 1, the supply connector 2 is provided with a double cylindrical housing 19 including an inner housing 19a and an outer housing 19b. A compression coil spring 20 is disposed in a gap between the inner and outer housings 19a and 19b so that an outer end of the spring 20 detachably contacts with an opening edge on the vehicle inlet 1 to assist a separating action of the inlet 1 and connector 2.

The spring 20 biases the supply connector 2 to a returned position when the supply connector 2 is inserted into the vehicle inlet 1. This biasing force to the returned position is applied to the supply connector 2 from the position in which the plunger balls 84 engages with the guide slots 74a.

Figure 8:
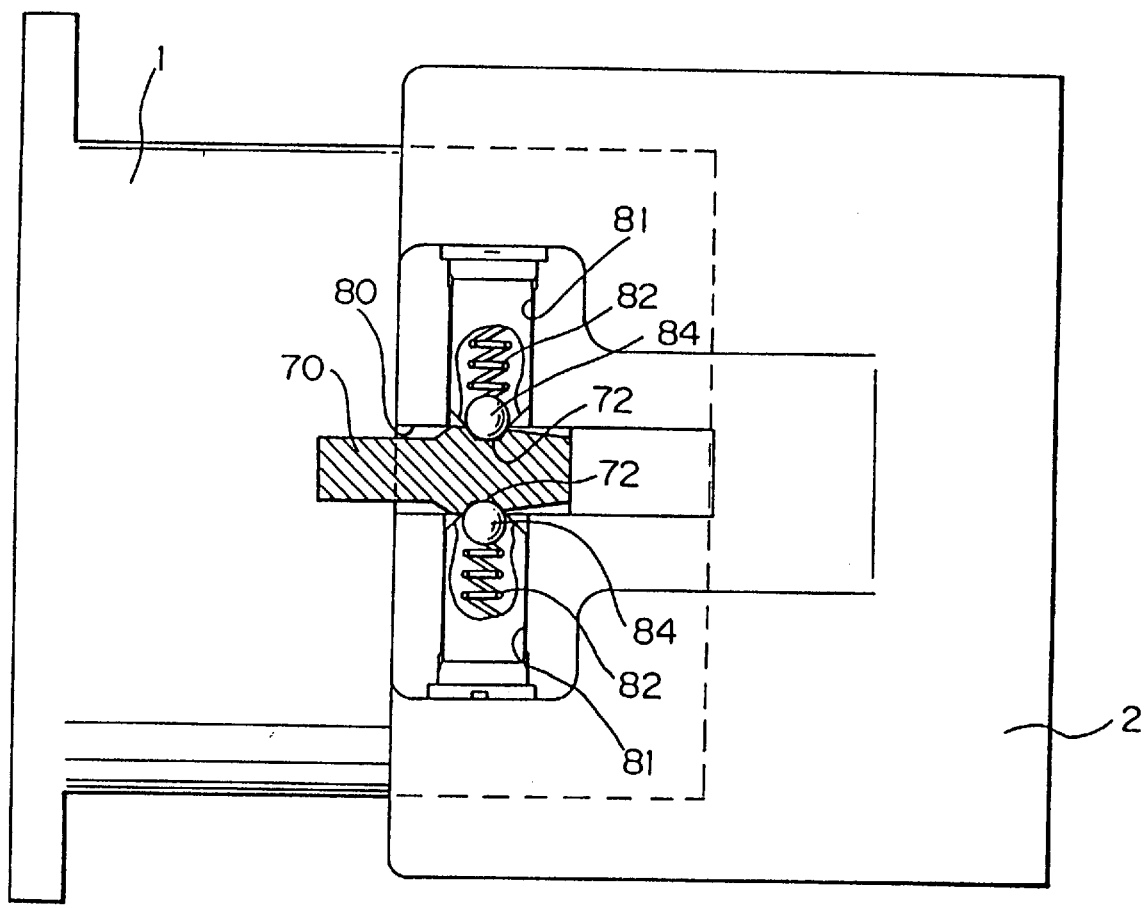
FIG. 8 is a fragmentary sectional view of the coupling under the half fitting state, taken from a bottom side of FIG. 4.

The outer housing 19b is provided on a lower side with the engaging groove 80 which engages with the ridge 70 axially (see FIG. 8).

A tunnel 81 crosses vertically the engaging-groove 80. Compression coil springs 82 are accommodated in the tunnel 81 so that each end of the spring 82 biases the plunger ball 84 toward the engaging groove 80. The plunger balls 84 which serve as the locking mechanism engage with the guide slots 74a and 74b in the ridge 70 to guide it when the supply connector 2 is inserted into the vehicle inlet 1. When the plunger balls 84 engage with the recesses 72, the supply connector 2 is held at the temporary fitting position relative to the vehicle inlet 1.

The inner housing 19a is provided in its interior with charge terminals and signal terminals, which are corresponding to the charging terminals 5 and signal terminals 6. The terminals are connected through a cable 23 to a power source on the ground.

The outer housing 19b is provided on a top face with a flap lid 24 which detachably covers an opening of the outer housing 19b. The flap lid 24 is rotatably supported on a support pin 26 received in a bearing portion 25 formed on the top face of the outer housing 19b. A torsion spring 27 is mounted on the support pin 26 to bias the spring-back flap 24 toward a returned direction (a direction of closing the opening of the housing 19). A lock piece 28 is formed on a top face of a body 29 connected to a rear portion of the housing 19 to hold the flap lid 24 in an opened position. The lock piece 28 detachably engages with an edge 30 of the flap lid 24 at the distal end thereof and slides on the body 29 forwardly and rearwardly. Further, the lock piece 28 mounts a spring 31 on its rear portion so that the lock piece 28 is biased toward a direction of engaging with the flap lid 24 by the spring 31.

The body 29 is provided on its rear portion with a grip shaft 32 which extends axially and is adapted to fit the housing 19 to the inlet housing 3 of the vehicle inlet 1. An operation lever 33 is rotatably attached to a proximal end of the grip shaft 32 through a rotary axle 34 to assist the supply connector 2 to be fitted to the vehicle inlet 1. A torsion spring 35 is mounted on the rotary axle 34 to bias the lever 33 to an opened position. A pair of stays 36 are coupled to the lever 33. A fitting-assist mechanism is constituted by the lever 33 and stays 36. The lever 33 is formed into an L-shaped body. The stays are coupled through a coupling pin 37 to a bent portion of the lever 33.

Figure 4:
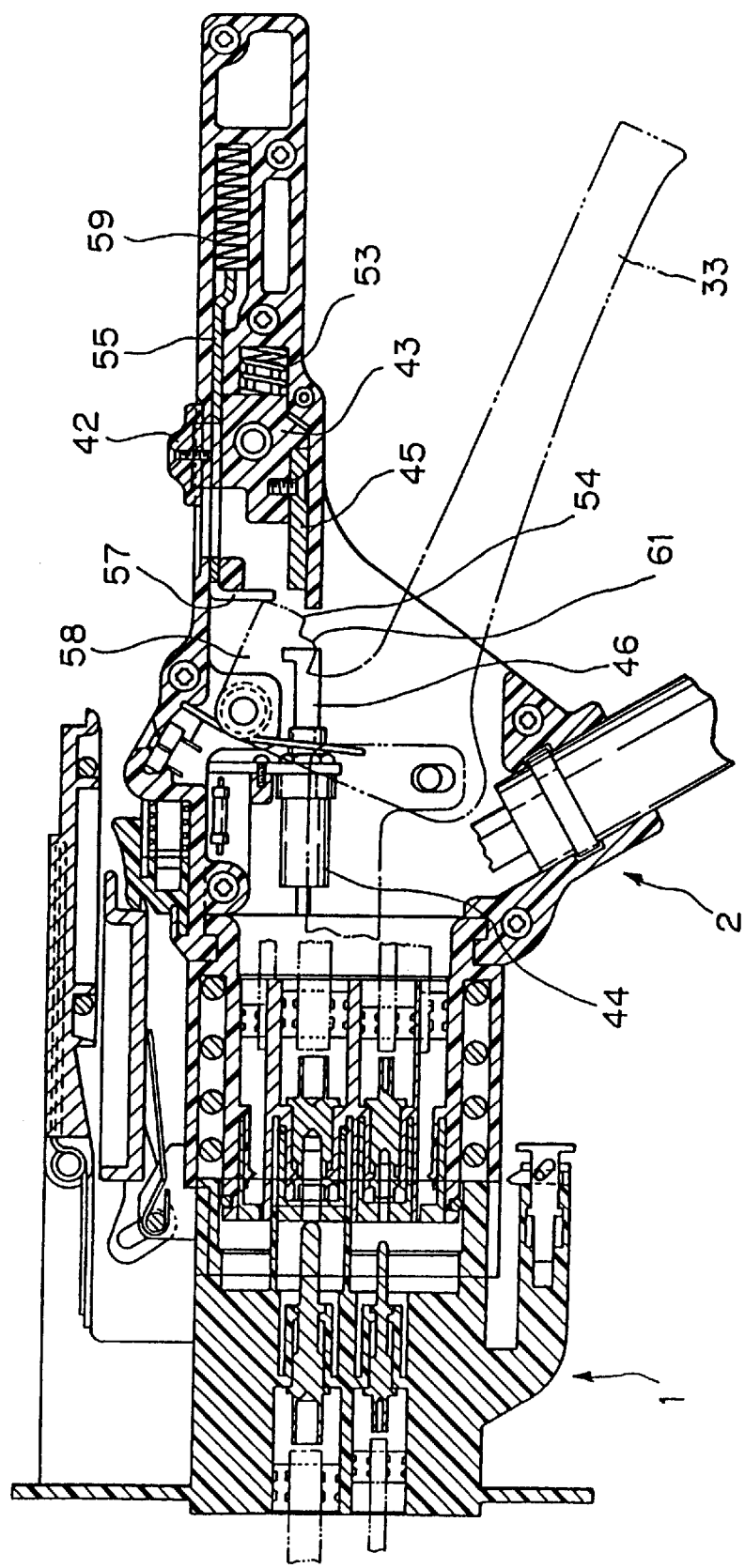
FIG. 4 is a longitudinal sectional view similar to FIG. 1, illustrating the coupling under a half fitting state.
Figure 10A:
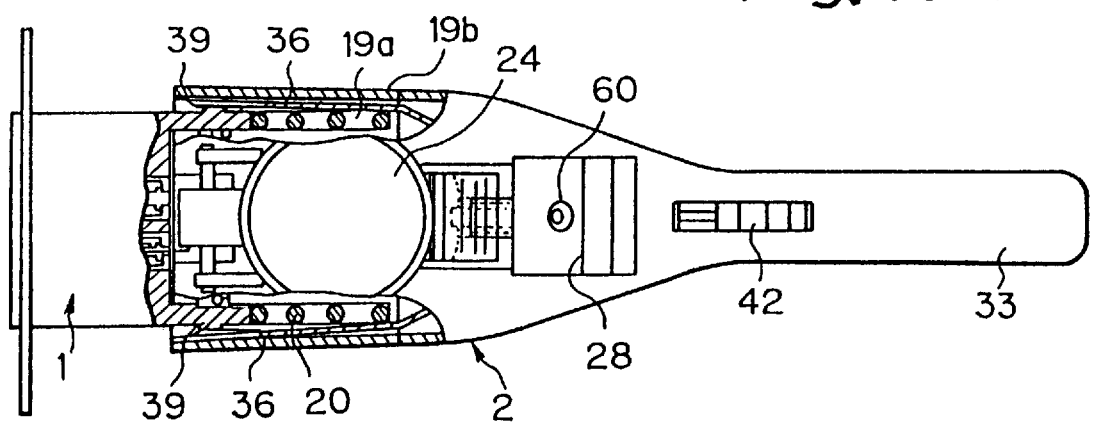
FIGS. 10A to 10C are plan views of the supply connector partially broken away, illustrating a stay under a normal position (A), under a narrowed position (B), and under an extracted position (C)
Figure 10B:
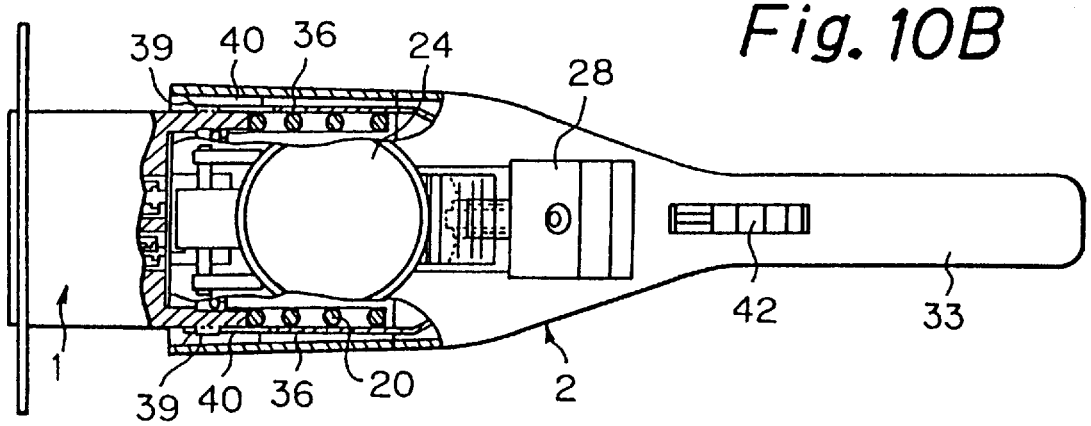
Figure 10C:
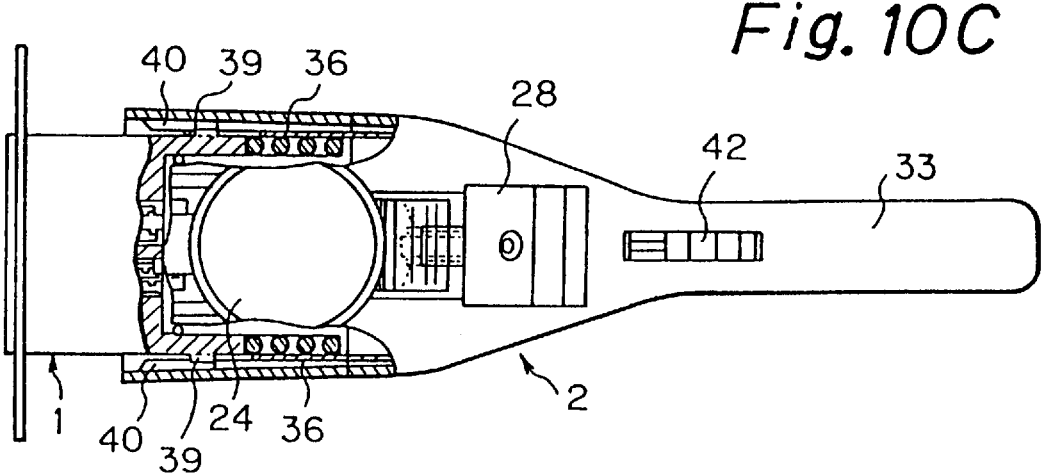
Figure 12A:
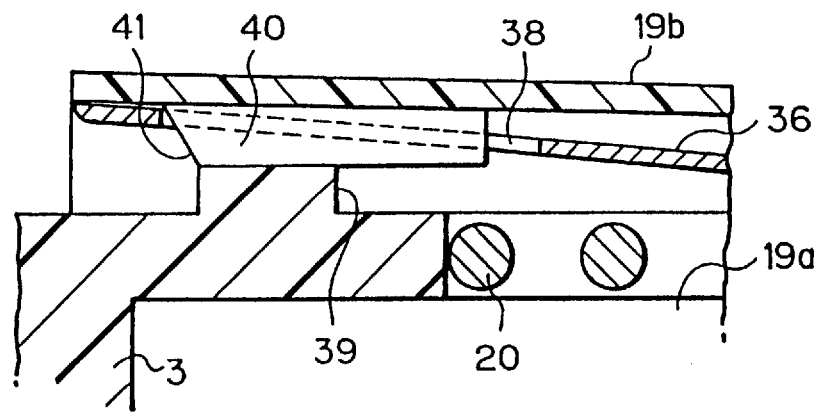
FIGS. 12A and 12B are enlarged fragmentary sectional views of a guide projection, illustrating the stay in a widened state (A) and under a narrowed state (B)
Figure 12B:
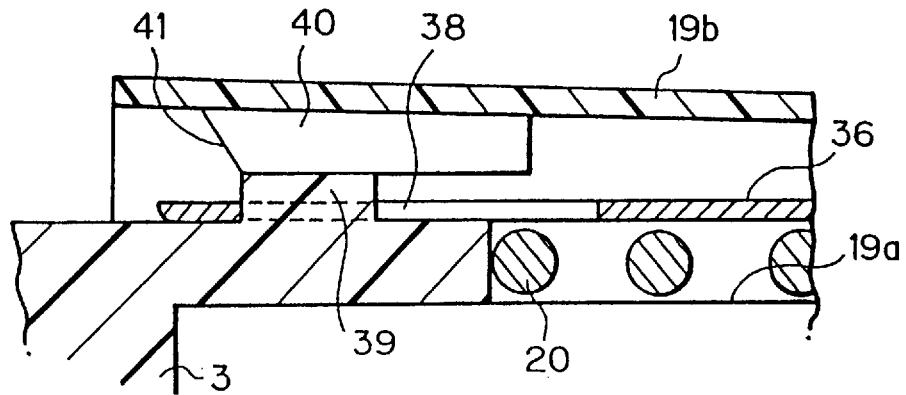

As shown in FIGS. 10A to 10C, each stay 36 is inserted into right and left sides in a gap between the inner housing 19a and the outer housing 19b. The stay 36 is provided on its distal end with an elongated slot 38 which receives each of bosses 39 projected on an outer face of the inlet housing 3 of the vehicle inlet 1 (see FIGS. 12A and 12B). Further, in order that the stays 36 do not interfere with the bosses 39 upon fitting the supply connector 2 to the vehicle inlet 1, a distance between the distal end of the stays 36 is widened under a normal condition as shown In FIG. 10A so that the slots 38 receive guide projections 40 formed on an inner wall of the outer housing 19b (see FIGS. 12A and 12B). However, when the stays 36 are retracted by grasping the lever 33, the distal ends of the stays 36 are narrowed so that an end of the slot 38 engages with a ramp 41 of the guide projection 40, thereby closely contacting the stays 36 with the outer face of the vehicle inlet 1. As shown in FIGS. 4 and 8, when the supply connector 2 is inserted to the temporary fitting position in the vehicle inlet 1, the plunger balls 84 engage with the recesses 72 in the ridge 70, thereby temporarily locking the supply connector 2 relative to the vehicle inlet 1. At this time, the stays 36 are narrowed and the bosses 39 on the vehicle inlet 1 are fitted to the holes 38.

Figure 13:
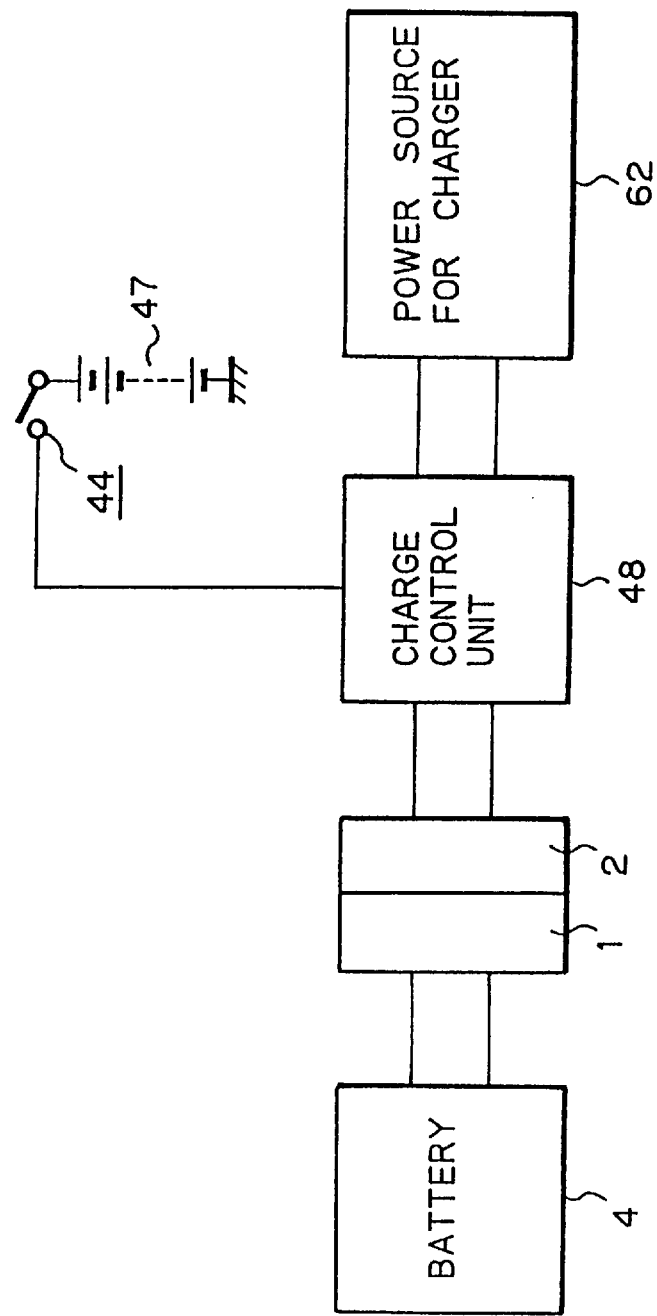
FIG. 13 is a circuit diagram of a charge circuit.

The grip shaft 32 is provided on an upper face with a slide switch 42 which opens and closes a charging circuit described hereinafter by referring to FIG. 13. The slide switch 42 has a slide block 43 disposed in the grip shaft 32 and a push plate 45 secured to a bottom of the block 43 and extending toward a microswitch 44 which constitutes a part of the charging circuit. When the slide switch 42 is driven to ON position (see FIGS. 2 and 11; a position shown by two dot chain lines in FIG. 2), the push plate 45 pushes a contact 46 of the microswitch 44.

Here, the charging circuit will be described below by referring to FIG. 13. A charge control unit 48 (for example, a relay circuit) which controls opening and closing of the charging circuit is disposed between the supply connector 2 and a supply power source 47. When the slide switch 42 is driven to the ON position (see FIGS. 2 and 11B; a position shown by the two dot chain lines in FIG. 2) to turn the microswitch 44 to ON, the microswitch 44 transmits an output signal through the supply power source 47 to the charge control unit 48. Conduction is enabled from a charger power source 62 to a vehicle battery 4 only when the microswitch 44 is closed and the conduction of charging current is inhibited when the microswitch 44 is opened.

Figure 2:
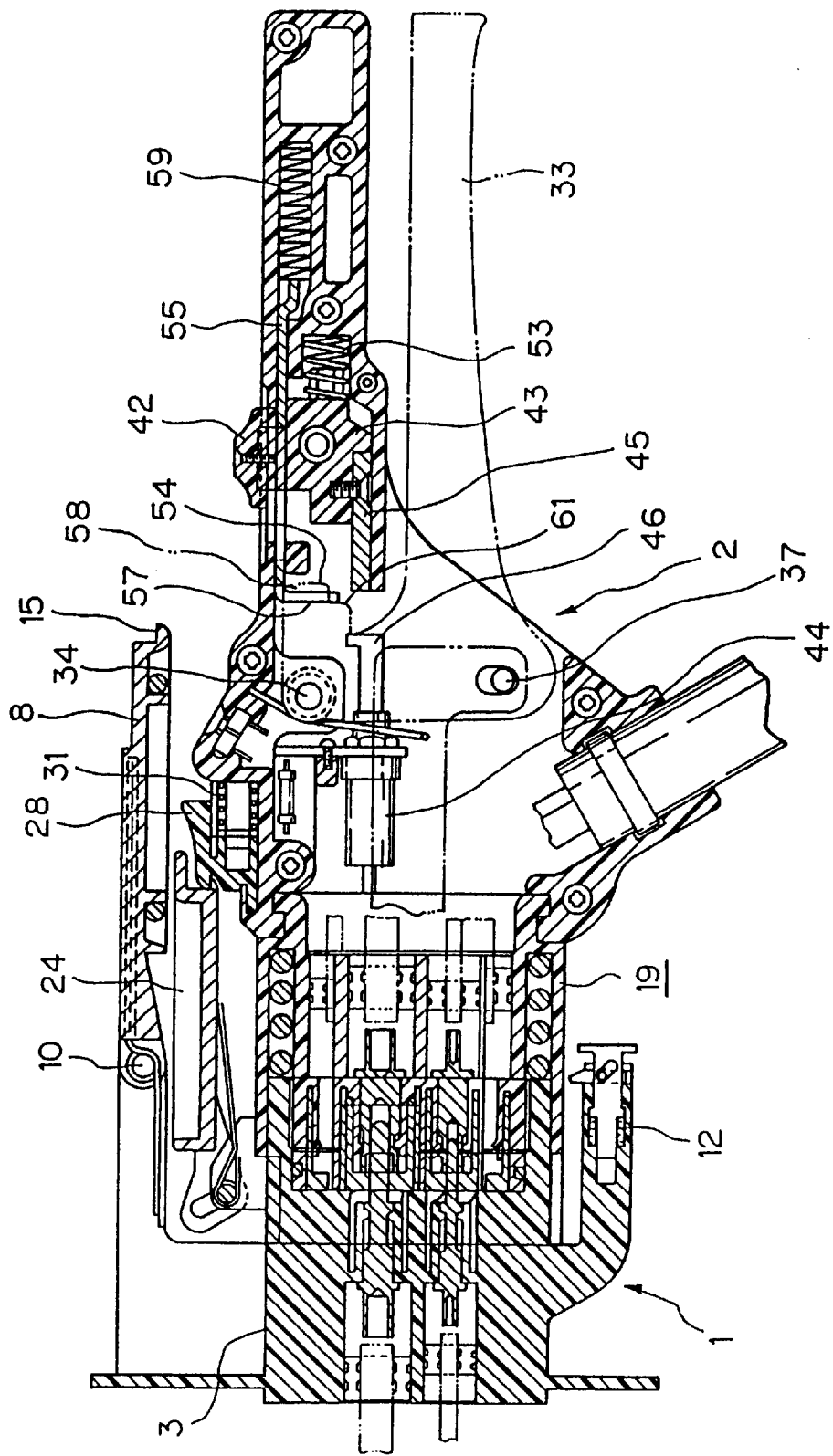
FIG. 2 is a longitudinal sectional view similar to FIG. 1, illustrating the coupling under a complete fitting state.
Figure 3:
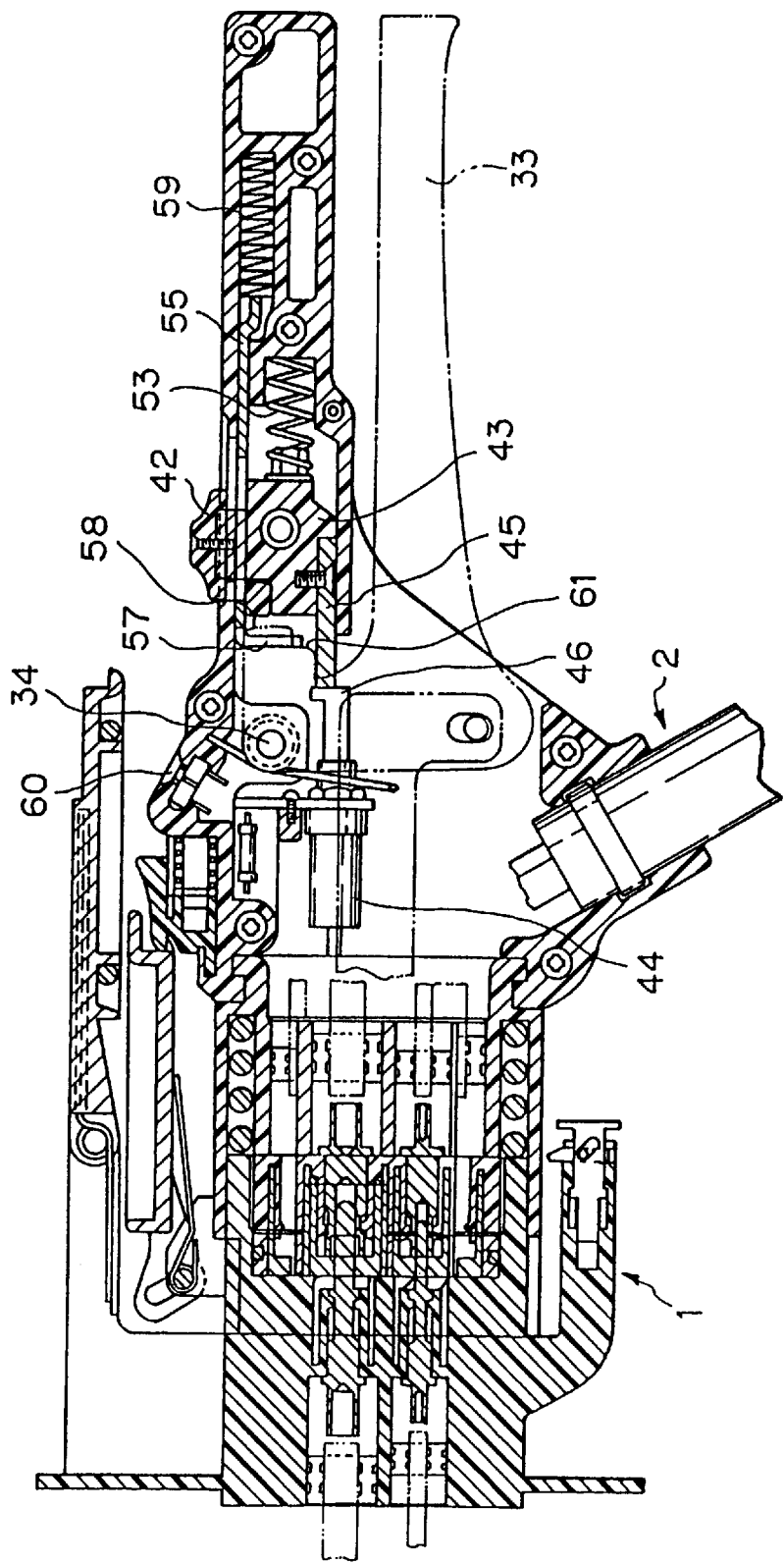
FIG. 3 is a longitudinal sectional view similar to FIG. 1, illustrating a slide switch of the coupling at a retracted position.
Figure 11A:
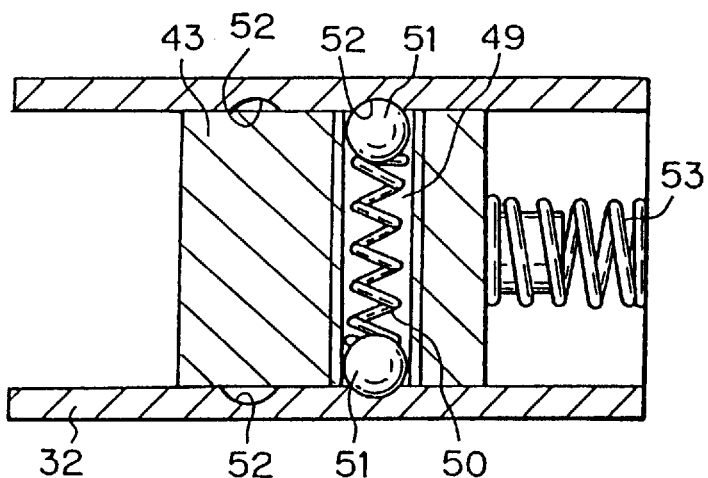
FIGS. 11A to 11C are longitudinal sectional views of the side switch, illustrating the switch at an OFF position (A), at an ON position (B), and a returned position (C)
Figure 11B:
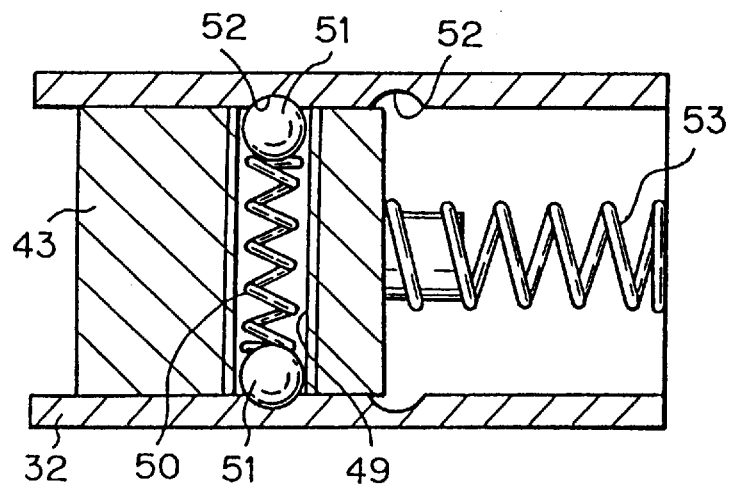
Figure 11C:
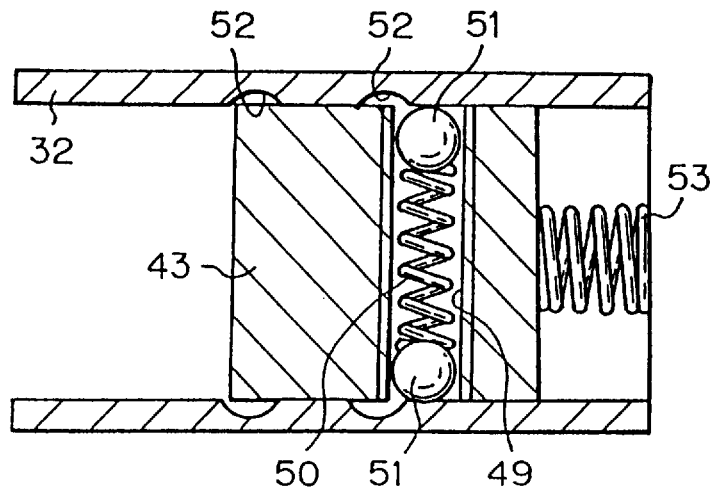

In this embodiment, the slide switch 42 can be disposed at three positions such as ON position (FIGS. 2 and 11B; a position shown by the two dot chain lines in FIG. 2), OFF position (FIGS. 1, 2 and 11A), and returned position (FIGS. 3 and 11C). The slide switch is maintained at the ON and OFF positions by the following manner. As shown in FIGS. 11A to 11C, the slide block 43 of the slide switch 42 is provided with a hole 49 extending diametrically. A compression coil spring 50 is accommodated in the hole 49 and balls 51 are disposed at the opposite ends of the spring 50 to elastically push the inner wall of the grip shaft 32.

On the other hand, the grip shaft 32 is provided on its inner wall with recesses 52, which are arranged at positions corresponding to the ON and OFF positions. When the balls 51 engage with the respective recesses 52, the slide switch 42 is maintained at the ON and OFF positions. Further, a compression coil spring 53 is disposed between a rear side of the slide block 43 and a support wall in the grip shaft 32 to bias the slide switch 42 from the returned position to the OFF position. However, since a spring force which pushes the balls 51 to the recesses 52 by the spring 50 is set to be stronger than that of the spring 53, the slide switch 53 cannot be displaced from the OFF position to the ON position only by the spring 53. If the operation applies a force more than a given force to the slide switch 42, the balls are released from the recesses 52.

The slide switch 42 can not be driven to the ON position so long as the supply connector 2 is not completely set to the vehicle inlet 1 (the complete fitting position). A first stopper face 54 is defined by an edge of an end portion of the lever 33 in the vicinity of the rotary axle 34 and in opposition to an end of the push plate 45 of the slide switch 42. The slide switch 42 is inhibited from being actuated to the ON position before the lever 33 reaches the predetermined angular position.

The grip shaft 32 is provided in Its interior with a lever-lock plate 55 which extends axially and serves to maintain the lever 33 at the closed position. The lever-lock plate 55 is provided in its middle portion with an escape slot 56 which enables the slide block 43 to displace in the grip shaft 32 and on its end portion with a downward bent portion. The downward bent portion of the plate 55 is provided with an aperture 57 which receives and holds a part of the lever 33. The lever 33 is provided below the first stopper face 54 with a stepped portion. An edge portion 58 having the first stopper face 54 is detachably engaged with the aperture 57. The lever 33 is provided below the edge portion 58 with a stepped stopper face 61 which constrains the push plate 45 from advancing unless the lever 33 is moved to the complete fitting position.

On the other hand, a compression coil spring 59 pushes a rear end of the lever-lock plate 55 to bias the plate 55 forwardly. The lever-lock plate 55 abuts on the first stopper face 55 under a normal condition to be constrained from advancing, as shown in FIG. 1 when the lever 33 is grasped to the complete fitting position so that the first stopper face 54 is opposite to the aperture 57, the edge portion 58 is inserted into the aperture 57 to hold the lever at the grasped position. Thus, the lever 33 is locked at the complete fitting position. An LED lamp 60 is lit when the charging circuit is turned to ON.

An operation and effects of this embodiment will be explained below. First, when the operation rod 13 is pushed the boss 17 is displaced along the cam groove 18 to lower the stopper pin 14. Then, the stopper pin 14 release the pawl 15 of the flap lid 8, the flap lid 8 is leaped up by the torsion spring 11 to be maintained at the opened position. On the other hand, the flap lid 24 of the supply connector 2 is turned up to the opened position against the torsion spring 27 and the lock piece 28 is driven to engage with the edge 30 of the flap lid 24, thereby maintaining the flap lid 24 at the opened position.

The operator holds the grip shaft 32, directs the inner housing 19a of the supply connector 2 to the inlet housing 3 of the vehicle inlet 1, and pushes the inner housing 19a into the inlet housing 3 by a suitable depth (incomplete fitting position). In this position, the supply connector 2 is temporarily supported in the vehicle inlet 1. At this time, since the stays 36 widen their distal ends as shown in FIG. 5A, the stays 36 do not interfere with the projections on the vehicle inlet 1.

When the supply connector 2 is further pushed into the vehicle inlet 1 against the biasing force, the plunger balls 84 move on the ridge 70 while they engage with the guide slots 74a. When the plunger balls 84 are received in the recesses 72, the supply connector 2 is temporarily held against the biasing force of the compression coil spring 20 (see FIG. 8).

At this time, since the stays 36 are widened at their ends, as shown in FIG. 10A, the bosses on the vehicle inlet 1 do not interfere the stays 36.

Next, when the operator grasps the lever 33 to retract the stays 36, the end of the elongated slot 38 engages with the ramp 41 of the guide projection 40 and the stays 36 are gradually deflected inwardly to receive the bosses 39 in the slots 38. If the operator continues to grasp the lever 33, the stays 36 are further retracted to exert a pulling force to the vehicle inlet 1. The supply connector 2 is pulled by a reaction of the vehicle inlet 1, thereby bringing the vehicle inlet 1 and supply connector 2 into the complete fitting position.

Meanwhile, the plunger balls are released from the recesses 72 and moves in the inner guide slots 74b toward the inner part of the ridge 70. The complete fitting state is not released unless the lever 33 is returned, although the compression coil spring 20 continues to exert the biasing force.

While the complete fitting position is achieved in the charge coupling, as shown in FIG. 1, the slide switch 42 causes the balls 51 to be fitted in the recesses 52 and the push plate 45 to abuts on the first stopper face 54 of the lever 33, thereby inhibiting the slide switch 42 from being driven to the ON position and avoiding miss-conduction. Similarly, the lever-lock plate 55 abuts on the first stopper face 54 at its distal end to be constrained from advancing.

Since the aperture 57 of the lever-lock plate 55 is adapted to receive the edge portion 58 of the lever 33 when the coupling reaches the complete fitting position, as shown in FIG. 2, the lever-lock plate 55 is advanced by the spring 59 and the edge portion 58 enters into the aperture 57. Thus, since the lever 33 is maintained in the grasped position the operator is released from continuing to grasp the lever 33.

When the lever 33 reaches the complete fitting position, the second stopper face 61 is displaced to a higher position enough to enable the push plate 45 to advance. If the slide switch 42 is driven from the OFF position to the ON position, the balls 51 are fitted in the recesses 52 in the ON position to maintain the slide switch 42 at the ON position. The slide switch 42 may be driven from the OFF position to the ON position (from the position shown in FIG. 1 to the position shown in FIG. 3) in connection with the lever 33 by increasing the biasing force of the spring 53 and turning the lever 33 to the complete fitting position. In this case, there is no need for a positioning mechanism including the spring 50, balls 51, and recesses 52. When the slide switch 42 is driven to the ON position, the push plate 45 pushes the contact 46 of the microswitch 44, and the charging control unit 48 closes the charging circuit, thereby conducting the battery in the vehicle.

In the case that impelling of a supply connector 2 is stopped before the supply connector 2 is completely fitted to a vehicle inlet 1, the supply connector 2 is returned to a half fitting position by a biasing force exerted in a compression coil spring 20. In this position, plunger balls 84 engage with recesses 72 to temporarily maintain the supply connector 2 at the position in the vehicle inlet 1 (see FIG. 8).

Since an engaging force exerted between the plunger balls 84 and the recesses 72 is set to be higher than the biasing force exerted by the compression coil spring 20, the supply connector 2 is urged from the vehicle inlet 1 only by the biasing force of the spring 20. Thus, in the case that the supply connector 2 is returned to the temporary fitting position, the operator can detect from the half open state of the lever 33 or the returning movement to the temporary fitting position that the supply connector 2 is not in the complete fitting position. Consequently, the operator can correct the fitting operation.

After the supply connector 2 has been brought into the complete fitting position, when the charging is finished, the microswitch 42 is retracted to the returned position (see FIG. 3). Then, the push plate 45 separates from the microswitch 44 to cease conduction to the charging circuit. When the slide switch 42 is retracted to the returned position, the lever-lock plate 55 is retracted to the returned position, the lever-lock plate 55 is retracted against the spring 59. The edge portion 58 of the lever 33 comes out from the slot 57 and the lever 33 is automatically returned by the torsion spring 35. Thus, when the supply connector 2 is being drawn out of the vehicle inlet 1, the supply connector 2 is biased to the returning direction by the compression coil spring 20, the stays 36 return in reverse order while the stays are advancing, the plunger balls 84 return in the guide slots 74b, and the plunger balls 84 enter into the recesses 72 to temporarily hold the supply connector 2. However, it is possible to release the plunger balls 84 from the recesses 72 by a drawing force above a given level by the operator. The plunger balls 84 return in the guide slots 74a by the biasing force of the spring 20 and the ridge 70 separates from the engaging groove 80. Thus, when the supply connector 2 separated from the vehicle Inlet 1, an extracting operation of the supply connector 2 is finished.

In the present embodiment, in the case that the supply connector 2 is not brought into the complete fitting state, the supply connector 2 is pushed back to the temporary fitting position to hold it at this position. Consequently, the operator can detect that the coupling is not brought into the complete fitting state. Thus, the operator repeats the fitting operation.

Since the supply connector 2 is held at the temporary fitting position, the supply connector 2 is prevented from falling from the vehicle inlet 1, thereby correcting the half fitting state of the coupling.

Further, conduction is enabled only after the terminals of the connector 2 and inlet 1 are completely interconnected and conduction is not enabled in the half fitting state, conduction due to a misoperation can be prevented.

Since conduction is not enabled when the coupling is not in the complete fitting state, that is, the supply connector cannot move relative to the vehicle inlet, the terminals does not move during conduction. The terminals are protected from sparks.

Further, the lamp is kept to be lit during conduction, the operator can detect the charging state.

The present invention may be altered in various forms. Although the lever 33 is provided with the stopper faces in this embodiment, they may be formed on another part so long as the stopper face inhibits the slide switch from being driven to the ON position under a normal condition and enables the driving of the switch upon detecting the complete fitting condition.

In this embodiment, the compression coil spring 20 is set to exert its biasing force from the time when the plunger balls 84 engage with the recesses. However, the spring 20 may be set to exert its biasing force immediately after the supply connector 2 is inserted into the vehicle inlet 1. The biasing force may be exerted from the position in which the connector 2 is temporarily held in the vehicle inlet 1.

In addition, the temporary fitting position is set to be a position in which the terminals in the inlet 1 and connector 2 begin to contact with each other in this embodiment. However, the temporary fitting position may be set to be anyplace regardless of the contact state of the terminals.

Next, a water-diverting means on the supply connector will be explained below by referring to FIGS. 9 and 14 to 16.

Figure 9:
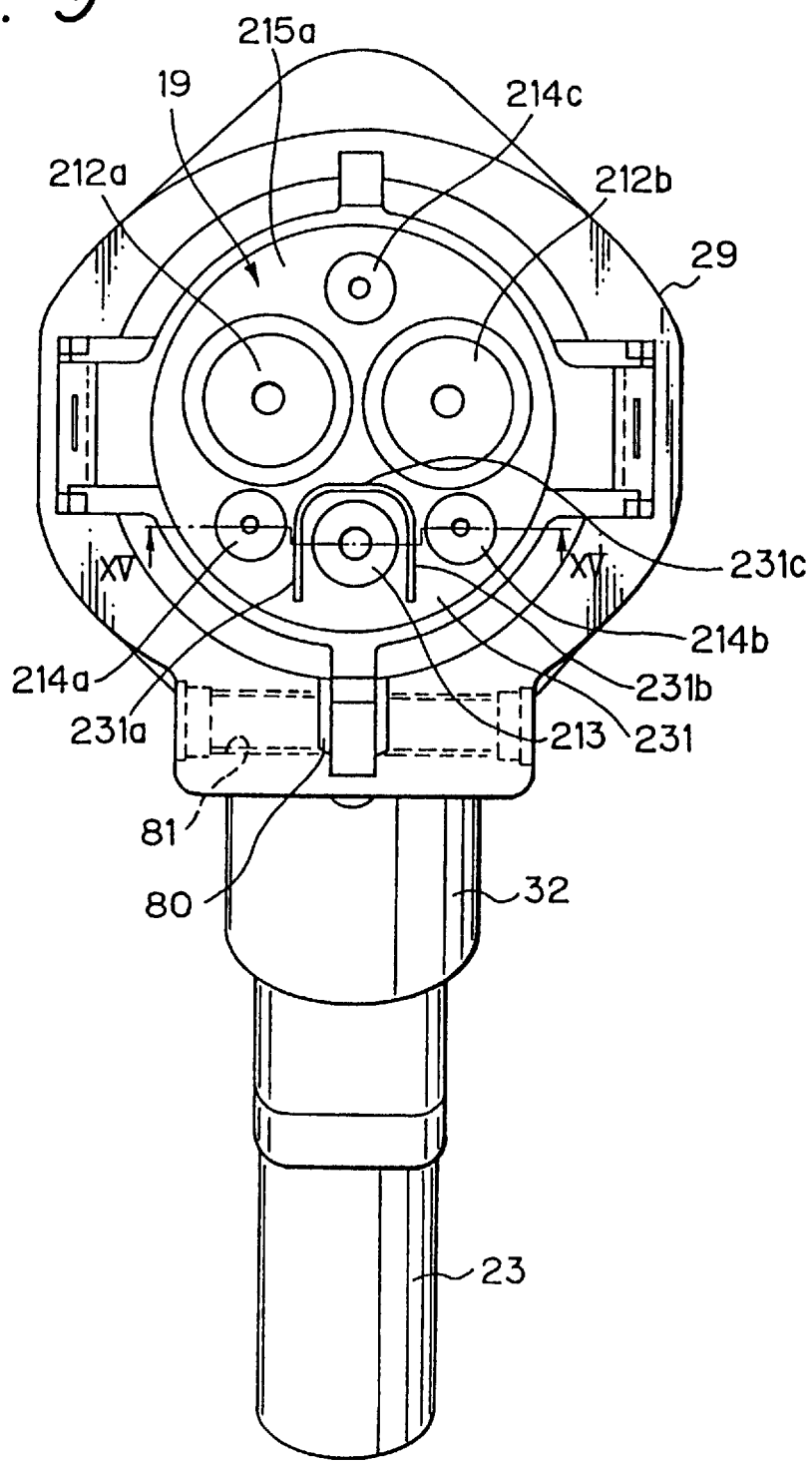
FIG. 9 is a front elevational view of a supply connector of the coupling.
Figure 14:
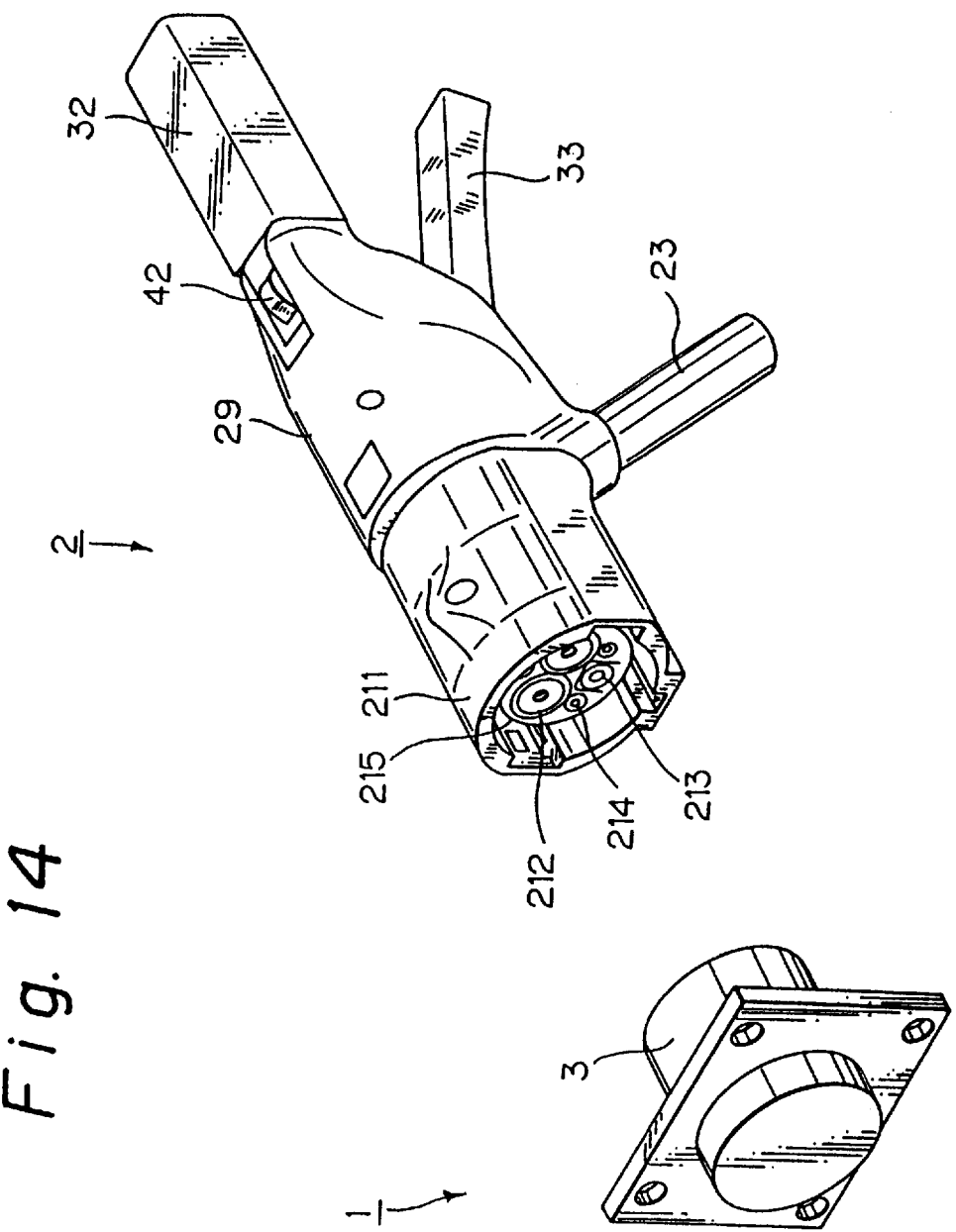
FIG. 14 is a perspective view of another embodiment of the coupling in accordance with the present invention, illustrating the supply connector disconnected from the vehicle inlet.
Figure 15:
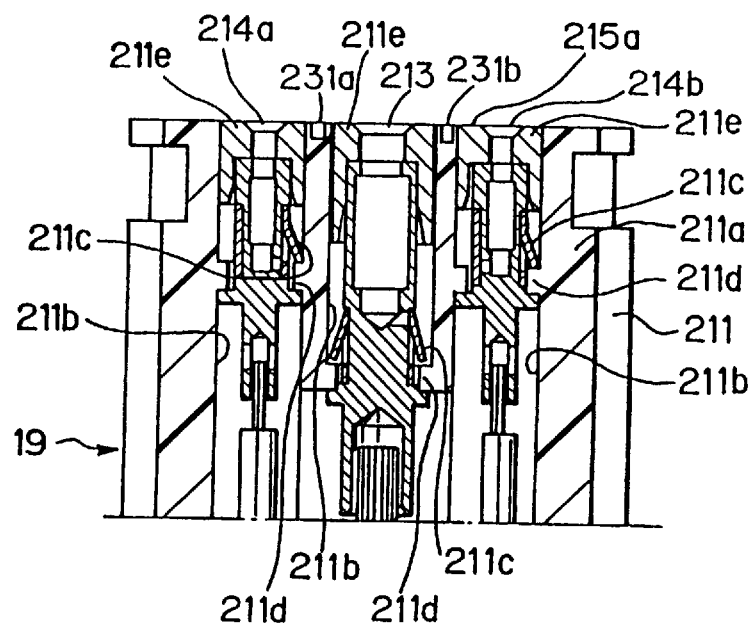
FIG. 15 is a cross sectional view of the supply connector taken along lines XV—XV in FIG. 9.
Figure 16:
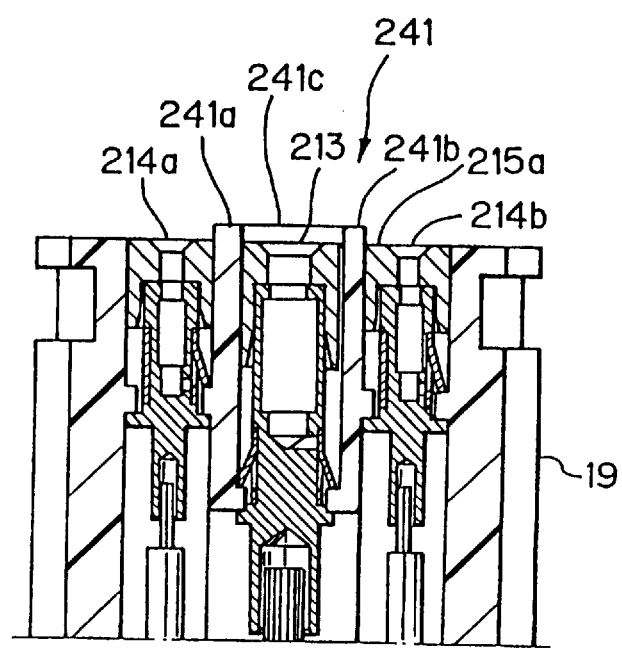
FIG. 16 is a cross sectional view similar to FIG. 15, illustrating another embodiment of the supply connector.

As shown in FIGS. 9 and 14, the connector housing 19 of the supply connector 2 is provided on symmetrical positions on a fitting face 215a with power source terminals 212a and 212b, on a central lower position on the face with an earth terminal 213, and on the opposite sides of the earth terminal 213 and on a central upper position on the face with signal terminals 214a, 214b and 214c. As shown in FIG. 15, the earth terminal 213 and signal terminals 214a, 214b and 214c are inserted into cavities 211b formed in a housing 211a. The terminals 213, 214a, 214b, and 214c are provided on their distal ends with metal latches 211c. When the latches 211c engage with shoulders 211d formed in the cavities 211b, the respective terminals 213, 214a 214b and 214c are prevented from coming out of the cavities 211b. Also, the cavities 211b are provided on their interiors near the fitting face 215a with cylindrical guide bushes 211e. The distal ends of the terminals 213, 214a, 214b and 214c are inserted into the bushes to prevent plays in the cavities 211b. Although it is not shown in the drawings, the power source terminals 212a and 212b are secured in the housing 211a by the same manner.

A water-diverting groove 231 is formed in a terminal area around the earth terminal 213 on the fitting face 215a. As shown in FIGS. 9 and 15, the groove 231 is generally formed into a reversed U-shape including a left down part 231a which sections a terminal area between the earth terminal 213 and the signal terminal 214a, a horizontal part 231c which sections a terminal area between the earth terminal 213 and the power source terminals 212a and 212b, and a right down part 231b which sections a terminal area between the earth terminal 213 and the signal terminal 214b. The opposite ends of the horizontal part 231c are connected to each end of the left and right down parts 231a and 231b.

Next, an operation of the above embodiment will be explained below.

If rainwater or the like adheres to the fitting face 215a of the supply connector 2 before the supply connector 2 is fitted to the vehicle inlet 1, a thin water layer is formed on the fitting face 215a. If the layer is formed over the terminals, leakage or short-circuiting will occur between the terminals. However, in this embodiment, the water-diverting groove 231 can prevent the water layer from spreading between the terminals.

That is, if rainwater adheres to either terminal area between the earth terminal 213 and the signal terminals 214a and 214b or the power source terminals 212a and 212b, a flowing path of the water layer is increased by any one of the left down part 231a, right down part 231b, or horizontal part 231c of the water-diverting groove 231. Thus, the water layer is cut off by the parts. That is, since the water-diverting groove can prevent the water layer from spreading on the fitting face, short-circuiting between the terminals is avoided.

Thus, according to this embodiment, when charging under wet conditions, even if the fitting face 215a of the housing 19 of the supply connector 2 is wetted by rainwater and the like before the supply connector 2 is fitted to the vehicle inlet 1, leakage and short-circuiting between the respective terminals the ends of which are disposed on the fitting face 215a can be prevented prior to charging and during charging.

As the water-diverting groove 231 is formed in the U-shape, the flowing path between the terminals is increased by a simple construction, thereby realizing simple water-diverting.

The water-diverting groove 231 is formed into a recess path in the above embodiment. However, in an alternation shown in FIG. 16, a water-diverting ridge 241 formed in a reversed U-shape and having projections 241a, 241b and 241c may be provided in lieu of the recess path. The ridge 241 can also increase the flowing path between the terminals. As the water-diverting ridge 241 projects from the fitting face 215a, the mating vehicle inlet is preferably provided on its fitting face with a reversed U-shape groove.

The water-diverting groove 231 is formed in the reversed U-shape in the above embodiment. The groove 231 may be formed in any shape which can increase the flowing path between the terminals in accordance with an arrangement of the terminals.

Next, an embodiment of a positioning member for a terminal will be explained below by referring to FIGS. 17 to 20.

Figure 17:
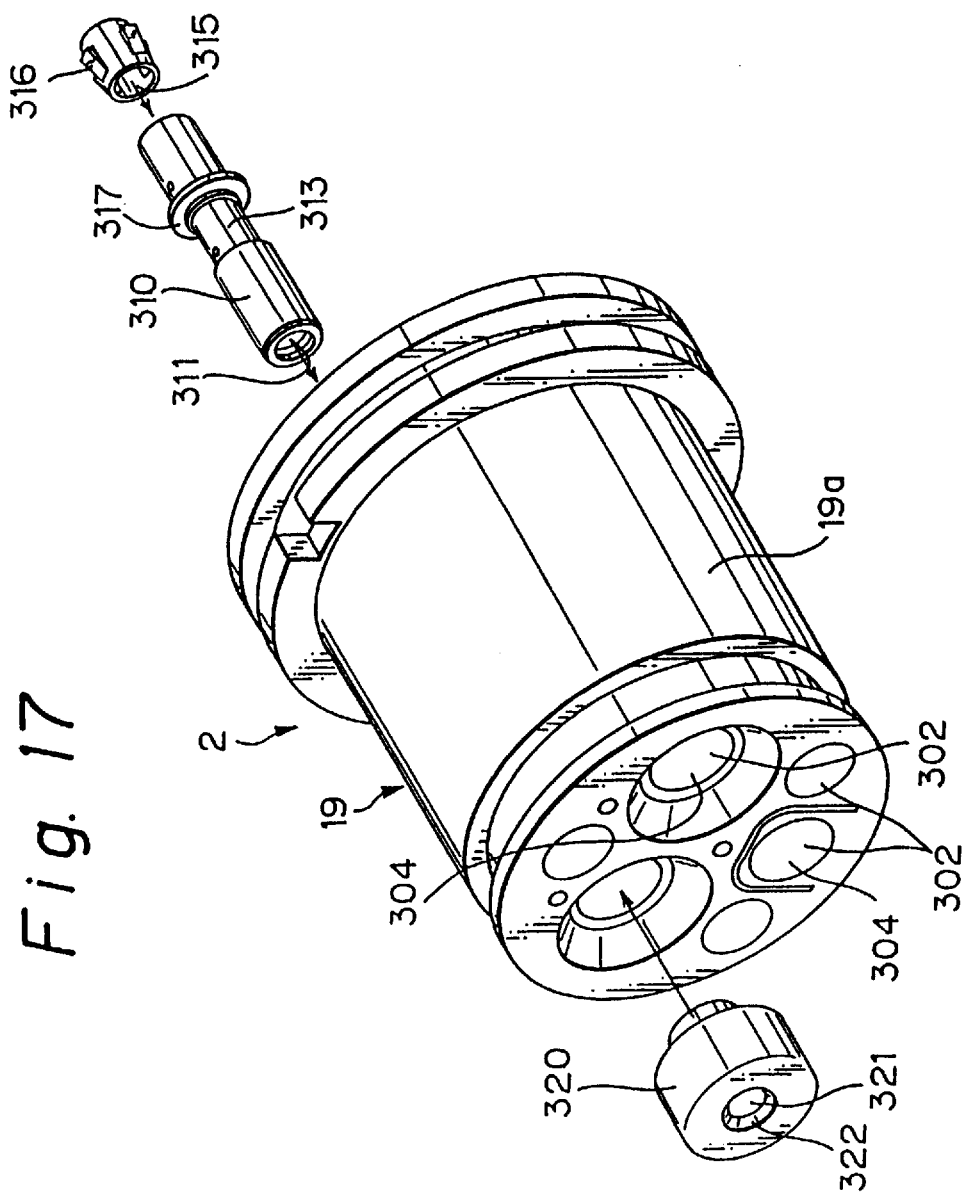
FIG. 17 is an exploded perspective view of an embodiment of a part of the supply connector.
Figure 18:
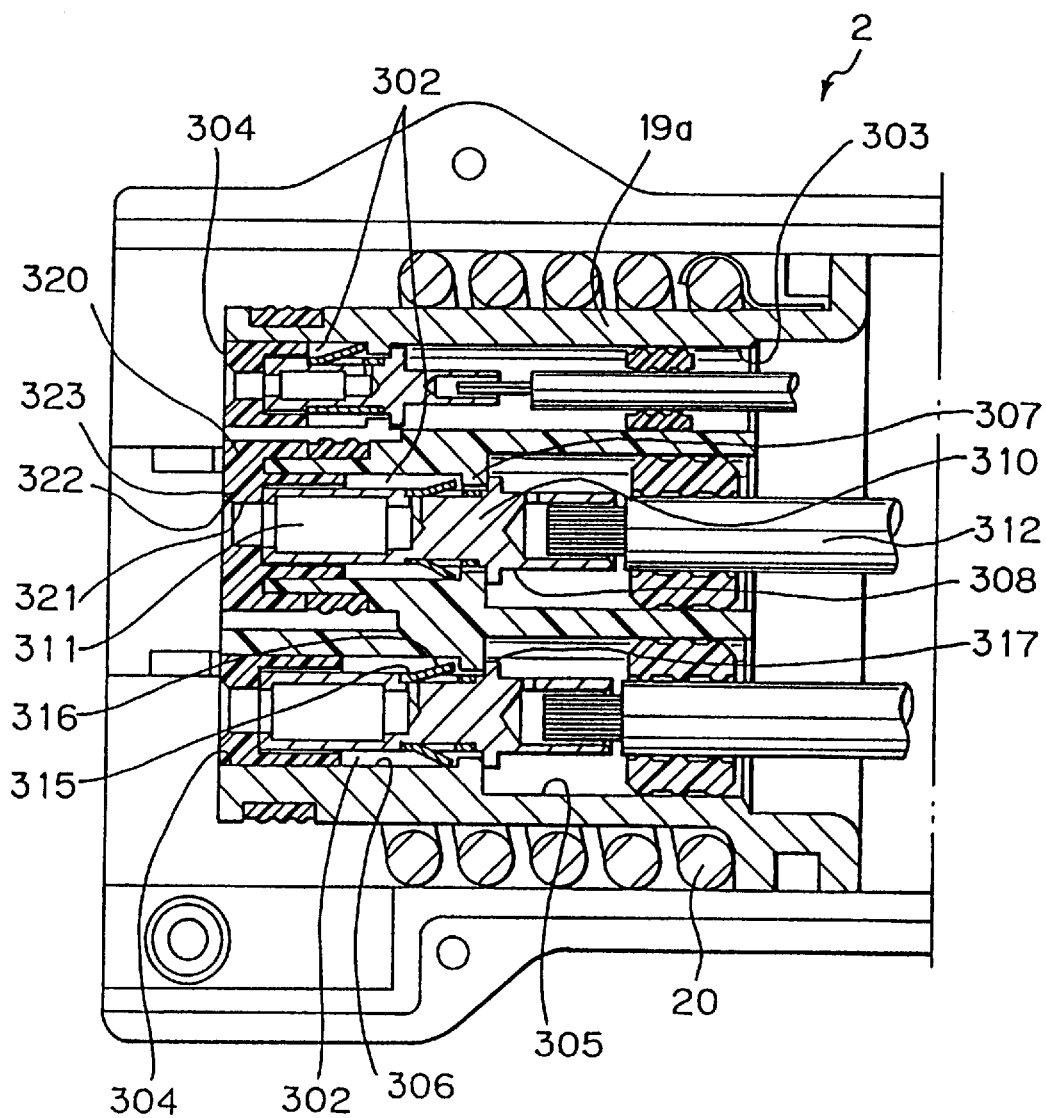
FIG. 18 is a longitudinal sectional view of the supply connector shown in FIG. 17, illustrating the connector under an assembled state.

As shown in FIGS. 17 and 18, a general circular inner housing 19a of the supply connector 2 is provided in its interior with three kinds and six in total of cavities 302 which are formed into a circular shape in cross section each having different diameters and interior configurations. The cavities 302 extend axially in parallel with each other and are open at their opposite ends of the inner housing 19a.

A rear opening of each cavity 302 is used as an insertion inlet 303 for receiving a terminal 310 described hereinafter while a front opening of each cavity 302 is used as a connection inlet 304 for receiving a terminal of a mating connector. The cavity 302 has an insertion space 305 and a connection space 306 which are formed into a circle in cross section and are disposed coaxially with each other. A ring like projecting stopper 307 is formed between the spaces 305 and 306 in the cavity 302. Thus a reduced diameter hole 308 is formed coaxially between the spaces 305 and 306.

A terminal 310 to be inserted into the cavity 302 is an elongated form having a circle in cross section. An outer diameter of the terminal 310 is slightly smaller than an inner diameter of the reduced diameter hole 308 of the cavity 302. The terminal 310 is provided on its end face with a fitting portion 311 to be coupled to a terminal of a mating connector not shown. A rear end of the terminal 310 is connected to an end of a cable 312 extending from a charging power source not shown.

The terminal 310 is provided on its outer periphery with an attaching portion 313 having a slightly reduced diameter. A retainer 315 is mounted on the attaching portion 313 to hold the terminal 310 in the cavity 302. The retainer 315 is generally in a form of a tube which can be widened circumferentially in a C-shape by a longitudinal slit. The retainer 315 is provided at a plurality of peripheral positions with a plurality of lances 316 which project outwardly.

The terminal 310 is provided on a rear position from the retainer 315 with a flange 317 having an outer diameter larger than the inner diameter of the hole 308.

When the terminal 310 is inserted into the cavity 302, the distal end of the terminal 310 is inserted into the insertion inlet 303 of the cavity 302 from a rear side of the inner housing 19a. After the distal end of the terminal 310 passes through the insertion space 305 and hole 308, the retainer 315 passes through the hole 308 while elastically deforming the lances 316 inwardly. After the lances 316 pass through the hole 308, the lances 316 expand outwardly by means of their elastic recovery forces, so that the expanded ends elastically engage with the inner periphery of the connection space 306. The flange 317 of the terminal 310 abuts on a rear face of the projecting stopper 307 (peripheral edge of the hole 308) immediately after the lances 316 have expanded. Thus, the terminal 310 cannot come out of the cavity 302 and insertion of the terminal 310 is completed.

When the terminal 310 is completely inserted into the cavity 302, the expanded ends of the lances 316 and the flange 317 engage with the front and rear end faces of the stopper 307, whereby the terminal 310 is positioned not to move longitudinally.

Next, a positioning means is explained below which enables centering of the terminal 310.

The positioning means comprises a cylindrical cap 320 adapted to be fitted in the connection inlet 304 in the cavity 302. The cap 320 is provided on a side facing to the terminal 310 with a coaxial positioning bore 323 which has a diameter enough to loosely receive the fitting portion 311 of the terminal 310. The cap 320 is provided on its front side with a fitting bore 321 which is adapted to receive a terminal of the mating connector not shown and is communicated with the positioning bore 323. The fitting bore 321 is coaxial with the positioning bore 323 and has a smaller diameter than the bore 323. Further, the fitting bore 321 is provided on its opening edge with a beveled guide face 322 which enables the mating terminal not shown from being smoothly inserted.

The cap 320 is secured to the connection inlet 304 of the cavity 302 by welding or pressing prior to inserting the terminal 310 into the cavity 302. After the cap 320 and terminal 310 are inserted into the cavity 302, the rear opening of the fitting bore 321 in the cap 320 is opposed to the front fitting end 11 of the terminal 310. The positioning bore 323 encloses the distal end of the terminal 310 with a slight clearance.

In the case that an external force perpendicular to the axis of the terminal 310 is applied to it due to a bending arrangement of the cable 312, the terminal 310 is likely to be inclined within a clearance between the lances 316 and the diameter-reduced hole 308 so that the lances 316 are elastically deformed. Since the distal end of the terminal 310 is inserted in the positioning bore 323 in the cap 320 with a little clearances the distal end of the terminal 310 is not shifted out of the axis of the cavity 302. Accordingly, the terminal 310 is held coaxially in the cavity 302 and even if a deviation of center occurs between the terminal 310 and the cavity 302, an amount of the center deviation is so small that the mating terminal can properly enter into the terminal 310.

When the mating connector is connected to the inner housing 19a in this state, the distal end of the mating terminal is inserted into the fitting bore 321 of the cap 320 and is smoothly inserted into the fitting portion 311 of the terminal 310. Accordingly, there is no problem of a connecting failure of the connector or breakage of terminals caused by interference between the terminals due to the center deviation of the terminals.

Since the inner diameter of the positioning bore 323 of the cap 320 is slightly larger than the outer diameter of the front end of the terminal 310, the terminal 310 can be easily into the positioning bore 323.

Since the fitting bore 321 is provided on its front end with the beveled guide face 322, the center deviation of the mating terminal is corrected toward the center of the fitting bore 321 by the beveled guide face 322 to smoothly insert the mating terminal into the fitting bore 321.

When the mating connector is not inserted into the cap 320, the front fitting portion 311 of the terminal 310 is not exposed so that it is disposed in an inner side of the fitting bore 321 in the cap 320. The fitting portion 311 of the terminal 310 is not touched by the operator, thereby preventing an electrical shock to the operator.

Figure 19:
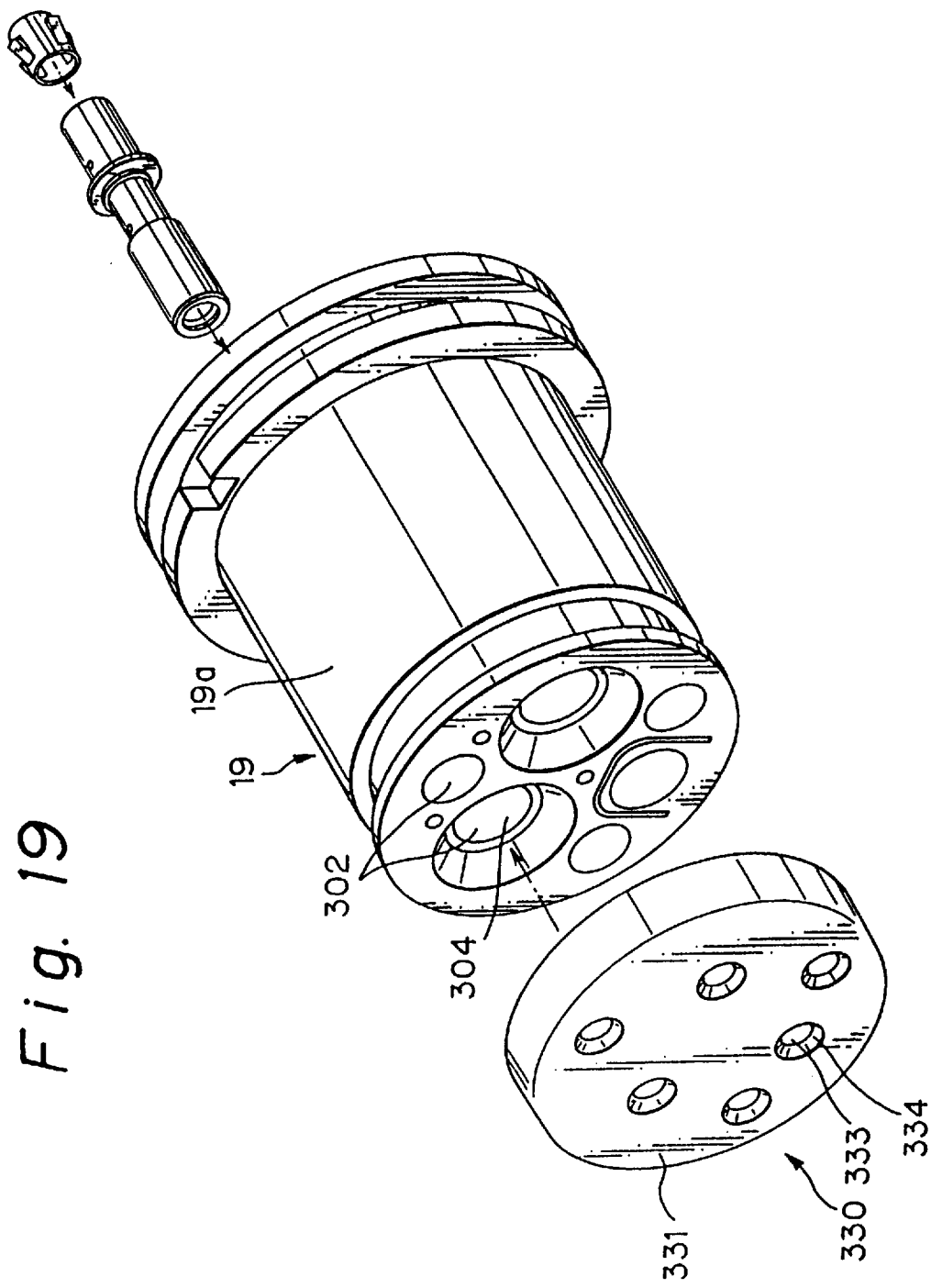
FIG. 19 is an exploded perspective view of another embodiment of a part of the supply connector.
Figure 20:
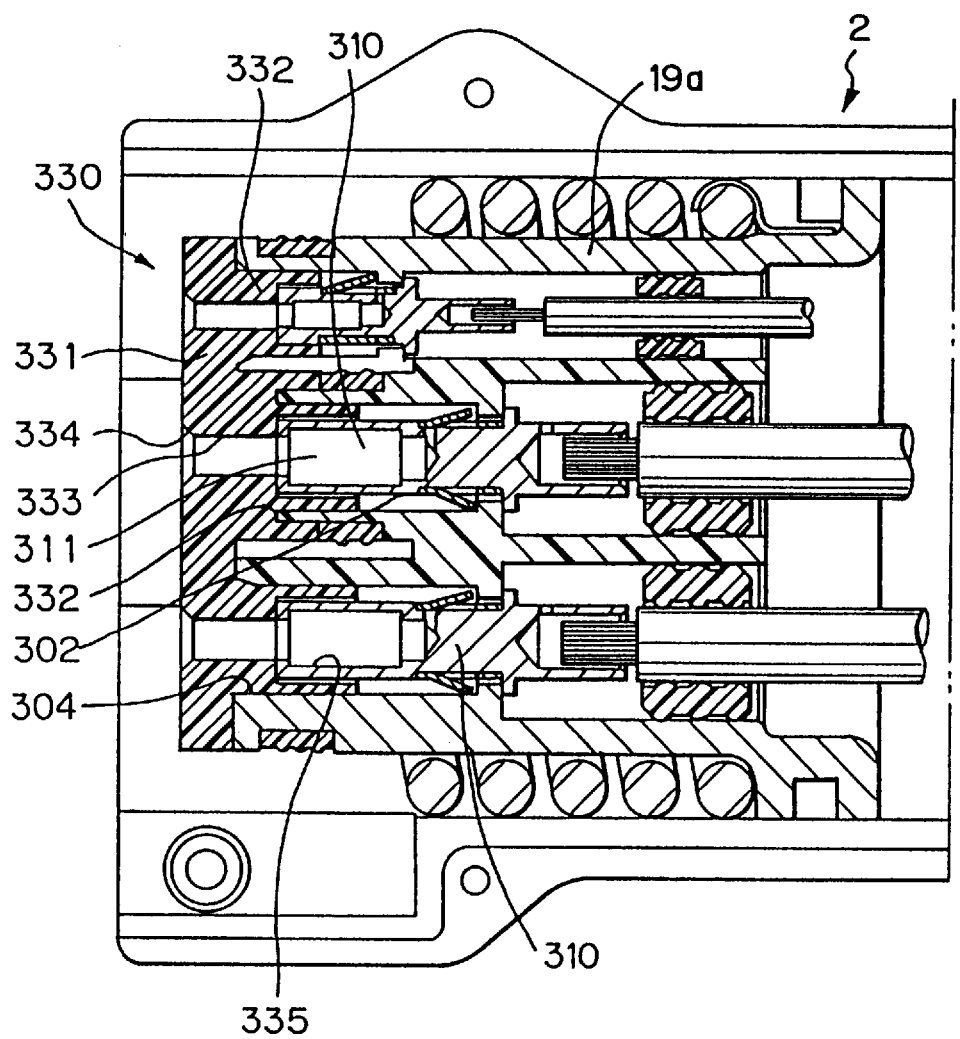
FIG. 20 is a longitudinal sectional view of the supply connector shown in FIG. 19, illustrating the connector under an assembled state.

Another embodiment of the positioning means will be explained below by referring to FIGS. 19 and 20.

In this embodiment, the same inner housing and terminal as the inner housing 19a and terminal 310 in the above embodiment are used.

A positioning means 330 for centering the distal end of the terminal 310 is constructed as follows.

The positioning means 330 includes a disk base plate 331 and six pipes 332 standing on the rear side of the plate 331 at the positions corresponding to the cavities 302. Each pipe 332 has a fitting bore 333 with a beveled guide face 334 on the front side of the plate 331 and a positioning bore 335 which is opened at the rear end face of the pipe 332.

In order to insert the positioning means 330 into the inner housing 19a, each pipe 332 is inserted into the corresponding connection inlet 304 in the cavity 302. The rear side of the base plate 331 is closely contacted with the front side of the inner housing 19a and the contacting faces are welded.

When the positioning means 330 is attached to the inner housing 19a, the rear opening of the fitting bore 333 is faced to the front fitting portion 311 of the terminal 310. The positioning bore 335 encloses the distal end of the terminal 310 with a slight clearance.

Accordingly, even if an external force is applied to the terminal 310 in a direction perpendicular to the axis of the terminal, the terminal 310 is held coaxially with the cavity 302 since a slight clearance is provided between the distal end of the terminal 310 and the positioning bore 335.

The present invention should not be limited to the above embodiments. For example, following alternations can be carried out in accordance with the present invention.

(a) In the above embodiments, three kinds and six cavities 302 in total are provided. However, the kind and member of the cavity is optional.

(b) The positioning means should not be limited to the positioning means 330 having the cylindrical cap 320 and pipes 332. For example, by using a positioning means having more than three constraining pieces spaced equiangular position circumferentially, each constraining piece may be opposed to the outer periphery of the distal end of the terminal with a slight clearance. In brief, another positioning means may be utilized.

Next, another embodiment of a temporary locking mechanism which temporarily locks a supply connector 2 at a temporary fitting position relative to a vehicle inlet 1 will be explained by referring to FIGS. 21 to 27.

Figure 21:
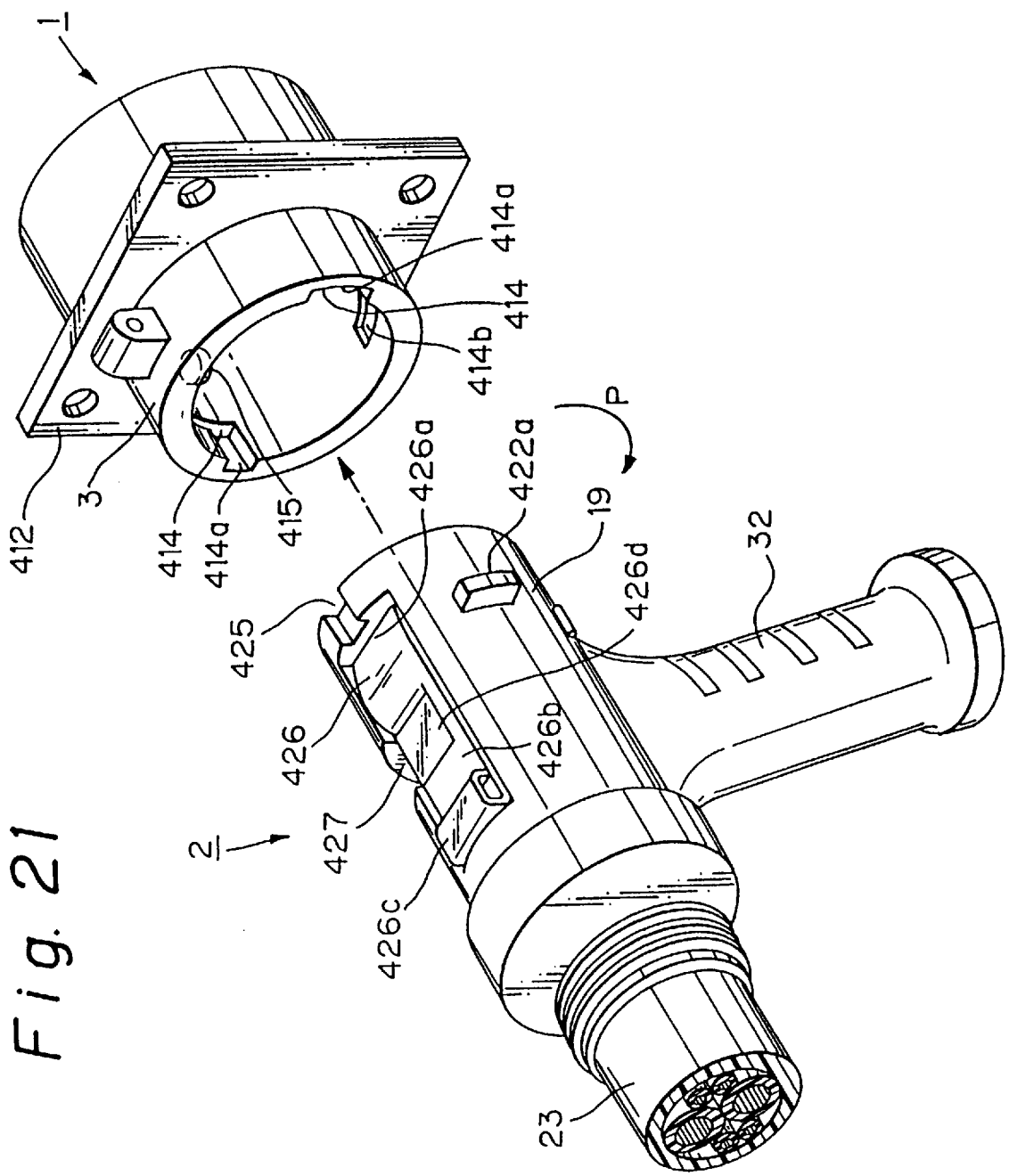
FIG. 21 is a perspective view of another embodiment of the charge coupling for an electric vehicle in accordance with the present invention, illustrating a supply connector separated from a vehicle inlet.
Figure 22:
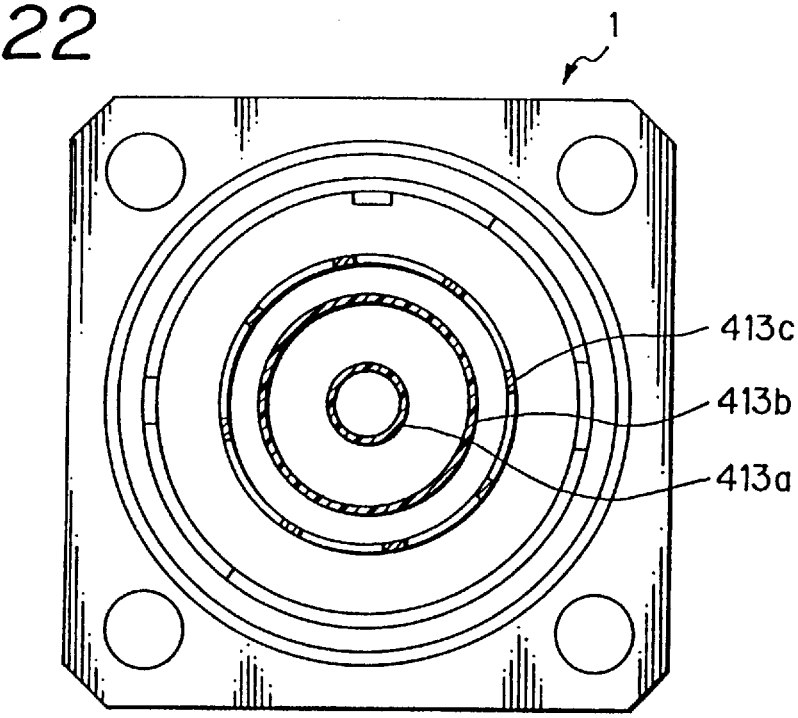
FIG. 22 is a front elevational view of the vehicle inlet shown in FIG. 21.

As shown in FIG. 21, the vehicle inlet 1 includes a guide cylindrical portion or an inlet housing 3 and a rectangular flange 412 formed integrally on the housing 3. As shown in FIG. 22, the inlet housing 3 is provided coaxially at inner sides in the interior with power source terminals 413a and 413b and at an outer side in the interior with a signal terminal 413c. The power source terminals 413a and 413b are provided fully on the respective circles while the signal terminal 413c is spaced circumferentially on another circle.

As shown in FIG. 21, the inlet housing 3 is provided on its inner periphery with a pair of spiral grooves 414 which are formed substantially symmetrically relative to the axis from their beginning ends 414a to their terminating ends 414b. Engaging bosses 422 of the supply connector 2 to be described hereinafter move in the spiral grooves 414 to displace the supply connector 2 from a temporary fitting position to a complete fitting position relative to the vehicle inlet 1. The beginning ends 414a of the spiral groove 414 are open outwardly. When the engaging bosses 422a and 422b of the supply connector 2 are disposed in the beginning ends 414a of the spiral groove 414, the supply connector 2 is in a temporary fitting state relative to the vehicle inlet 1. When the bosses 422a and 422b are disposed in the terminating ends 414b of the spiral groove 414, the supply connector 2 is in a complete fitting state relative to the vehicle inlet 1. The inlet housing 3 is provided at an upper side on an inner periphery with a ridge 415 which positions the supply connector 2 upon fitting.

Figure 24:
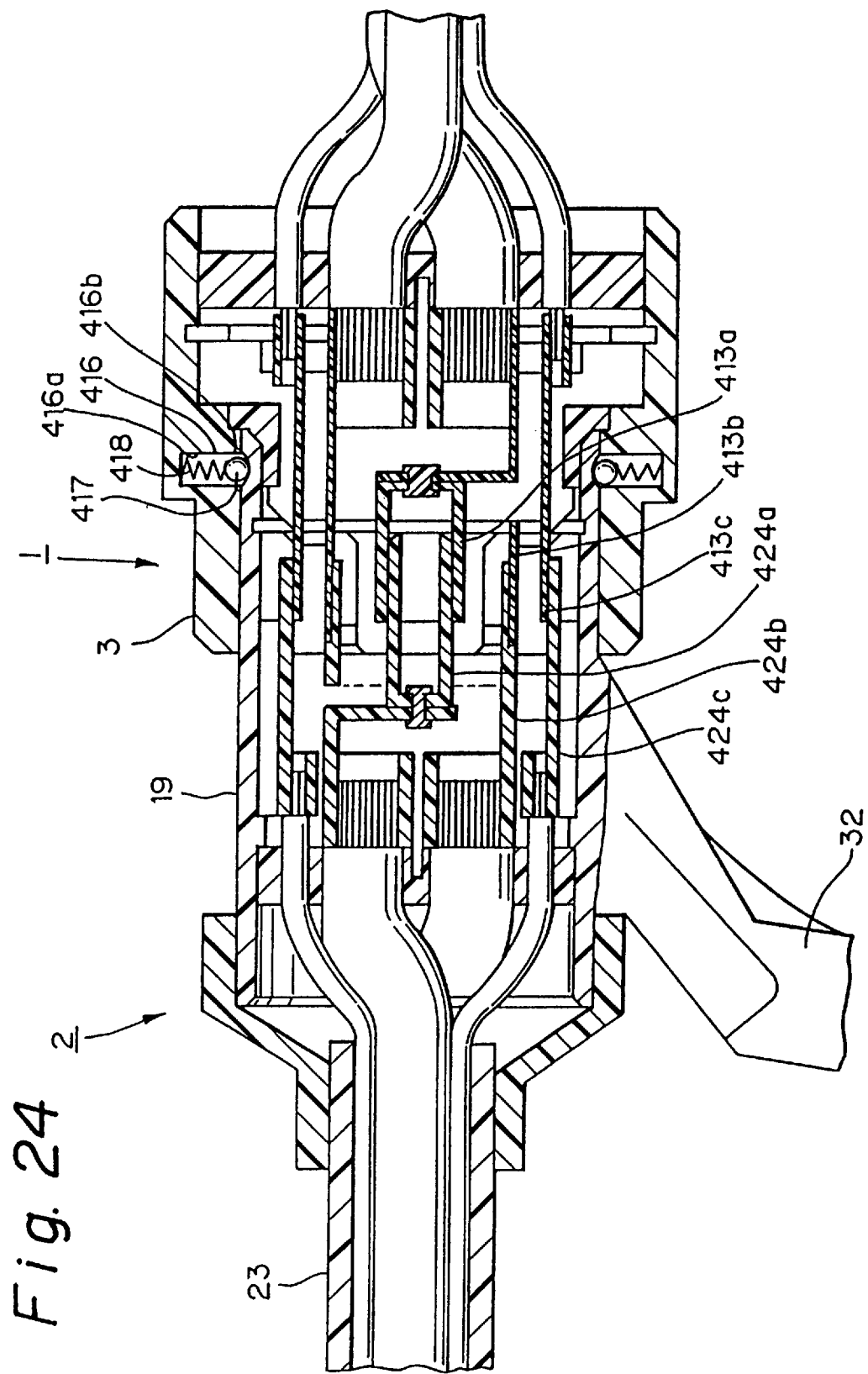
FIG. 24 is a longitudinal sectional view of the coupling shown in FIG. 21.
Figure 25:
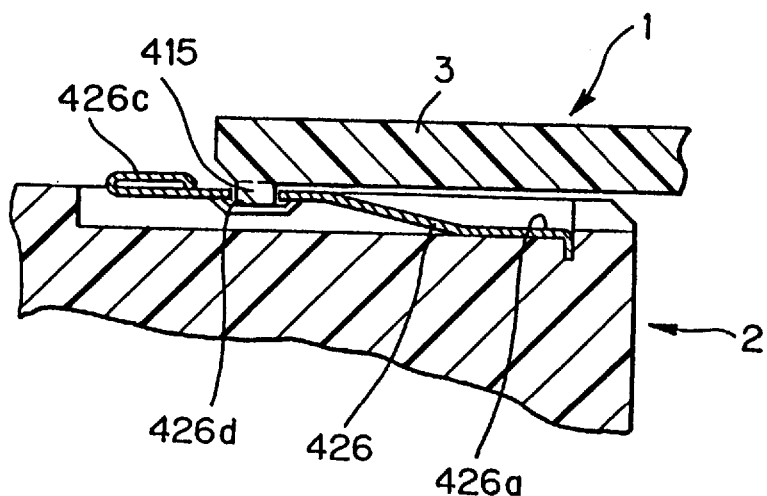
FIG. 25 is a fragmentary sectional view of the coupling shown in FIG. 21, illustrating the supply connector at a half fitting position relative to the vehicle inlet.

On the other hand, as shown in FIG. 24, the inlet housing 3 is provided in its interior with a pair of holding mechanisms 416 which are disposed symmetrically relative to the axis of the housing 3 to maintain the inlet 1 and connector 2 in the complete fitting state. The holding mechanisms 416 include a pair of tunnels 416a which are formed radially in an inner wall of the housing 3 to communicate with the interior of the housing 3, plunger balls 417 each of which is accommodated in each tunnel 416a, and compression coil springs 418 each of which biases the plunger ball 417 toward the inner periphery of the housing 3 in the tunnel 416. The plunger ball is smaller than an inner diameter of the tunnel 416a. An inner peripheral side opening 416b of the tunnel 416a is further reduced so that the plunger ball 417 does not come out of the tunnel 416a. The supply connector 2 is provided on its outer periphery with recesses which receive the plunger balls 417 when the connector 2 reaches the complete fitting position in the vehicle inlet 1.

Figure 23:
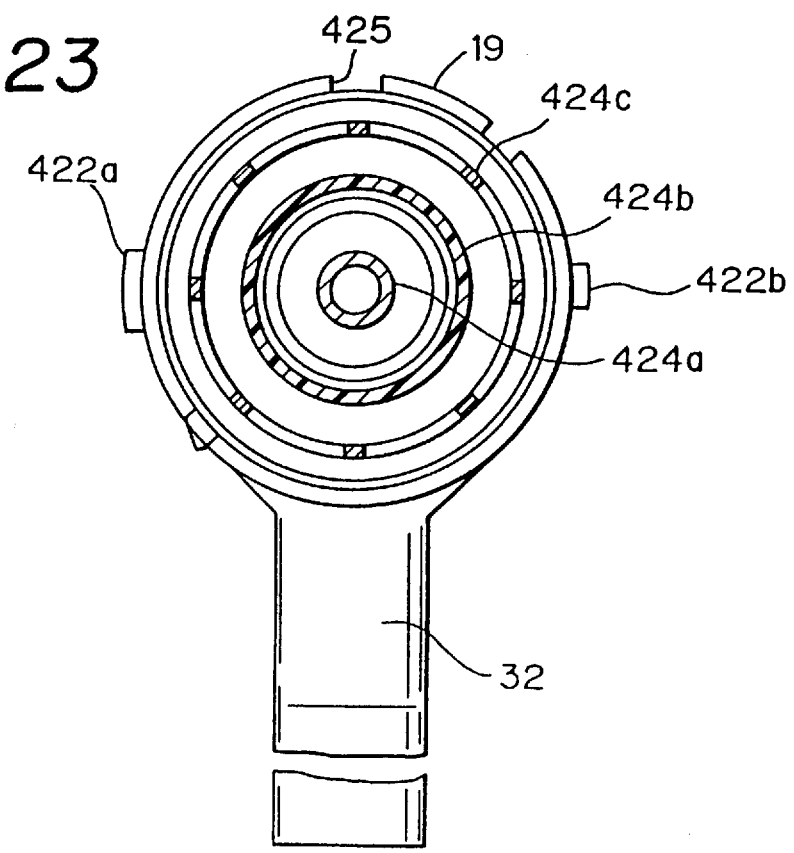
FIG. 23 is a front elevational view of the supply connector shown in FIG. 21.

On the other hand, as shown in FIG. 23, the supply connector 2 is provided coaxially in its interior with inner power source terminals 424a and 424b and an outer signal terminal 424c. These terminals are connected to the power source terminals 413a and 413b and signal terminals 413c in the vehicle inlet 1, respectively, when the supply connector 2 is fitted to the vehicle inlet 1. The inner power source terminals 424a and 424b are provided fully on the different circles while the outer signal terminals 424c is provided to be spaced on another circle. The signal terminals 424c in the supply connector 2 is disposed and spaced circumferentially from the signal terminals 413c in the vehicle inlet 1. That is, in the half fitting state of the coupling, the power source terminals 424a and 424b are connected to the power source terminals 413a and 413b while the signal terminals 424c are not connected to the signal terminals 413c. In the complete fitting state of the coupling, the signal terminals 424c are connected to the signal terminals 413c. The charger detects the complete fitting state of the coupling from connection of the signal terminals 413c and 424c. Conduction from the power source terminals 424a and 424b to the power source terminals 413a and 413b are enabled by a security circuit.

As shown in FIG. 21, the cylindrical shell or connector housing 19 of the supply connector 2 is provided on an outer periphery symmetrically relative to the axis of the housing 19 with a pair of bosses 422a and 422b (see FIG. 23), which engage with the respective spiral grooves 414 in the inlet housing 3. A hand lever 32 extends from the lower portion of the housing 19 at the rear side from the bosses 422a and 422b. The supply connector 2 is fitted to the vehicle inlet 1 by operating the hand lever 32 by one hand of the operator.

Further, the supply connector 2 is provided on its upper distal end with a slot 425 which receives a ridge 415 on an inner periphery of the housing 3. An elastically deformable piece 426 is disposed on an upper portion of the supply connector 2 at the rear side from the slot 425. The piece 426 is secured to the connector 2 at a base portion 426a which is disposed on a lower level than the bottom of the slot 425 and extends its free end rearwardly. An extending portion 426b continued to the base portion 426a is provided with a recess 426d which receives the ridge 415 when the coupling is in the half fitting state. This engagement of the ridge 415 in the recess 426d prevents the supply connector 2 from falling from the vehicle inlet by mistake in the half fitting state (see FIG. 25). The extending portion 426d is further continued to a pushing portion 426c. When the pushing portion 426c is pressed down, the ridge 415 is released from the recess 426d. Further, an escape groove 427 is provided on the outer periphery of the supply connector 2 in a spiral direction (not shown in detail in FIG. 26).

Next, a connecting operation of the vehicle inlet 1 and supply connector 2 will be explained below.

The operator holds the hand lever 32 by his one hand, brings the distal end of the supply connector 2 close the inlet housing 3 of the vehicle inlet 1, inserts the ridge 415 of the inlet 1 into the slot 425 in the connector 425, and inserts the bosses 422a and 422b of the connector 2 into the beginning ends 414a of the corresponding spiral grooves 414 of the inlet 1. The supply connector 2 is brought close the vehicle inlet 1 by handling the hand lever 32 with his one hand. Then, the ridge 415 moves onto the elastically deformable piece 426 and engages with the recess 426d, thereby holding the supply connector 2 at the half fitting state (see FIG. 25).

The operator turns the supply connector 2 in a direction P relative to the vehicle inlet 1 in FIG. 21 with his one hand. The ridge 415 moves from the recess 426d into the escape groove 427 while the bosses 422a and 422b move from the beginning ends of the spiral grooves 414 toward the terminating ends 414b. Consequently, the supply connector 2 is completely fitted to the vehicle inlet 1. The holding mechanism 416 shown in FIG. 24 is actuated at the complete fitting position, so that the supply connector is fixed at the complete fitting position in the vehicle inlet 1.

Since the power source terminals 424a and 424b and the signal terminals 424c of the supply connector 2 are arranged coaxially and the power source terminals 413a and 413b and the signal terminals 413c are arranged coaxially, the respective terminals are interconnected electrically, even if the connector 2 is moved from the half fitting position to the complete fitting position. In the half fitting state, the power source terminals 424a and 424b of the supply connector 2 are connected to the power source terminals 413a and 413b of the vehicle inlet 1 and the signal terminals 424c and 413c are not interconnected. When the coupling is brought into the complete coupling state by turning the hand lever, the signal terminals 424c and 413c are interconnected. Then, the charger detects the complete fitting state, thereby enabling conduction from the charger to the vehicle.

In order to detach the supply connector 2 from the vehicle inlet 1, the operator turns the hand lever 32 in the direction opposite to the direction P in FIG. 21 with one hand so as to rotate the supply connector 2 in the direction opposite to the direction upon connecting. Then, the bosses move from the terminating ends 414b of the spiral grooves 414 to the beginning ends 414a while the ridge 415 moves from the escape groove 427 to the slot 426d. Consequently, the coupling is brought from the complete fitting state to the half fitting state. If the operator moves the hand lever 32 in a separating direction, the ridge 415 detaches from the supply connector 2 through the recess 426d, elastically deformable piece 426 and slot 425 while the bosses 422a and 422b come out of the beginning ends 414a of the spiral grooves 414. Thus, the supply connector 2 is disconnected from the vehicle inlet 1.

According to the above embodiment, it is possible to realize one hand operation by holding the hand lever 32 with one hand and turning the lever 32 after positioning the connector 2 relative to the inlet 1. Accordingly, it is possible to enhance efficiency of connecting work.

A connecting process includes only fitting and turning steps of the hand lever 32 and does not require another step. Thus, a working time is shortened and efficiency is enhanced.

Further, the operator can detect from by touch that the coupling has reached the half fitting state when the ridge 415 engages with the recess 426d of the piece 426 and that the coupling reaches the complete fitting state when the bosses 422a and 422b displace from the beginning ends 414a of the spiral grooves 414 to the terminating ends 414b.

Separation or connection failure during charging can be prevented since the coupling is maintained in the complete fitting state by an action of the holding mechanism 416.

In this embodiment, the spiral groove 414 is provided in the vehicle inlet 1 and the bosses 422a and 422b are provided on the supply connector 2. A contrary construction can be taken.

Also, in the present embodiment, the coupling is connected by engagement of the spiral grooves 414 and bosses 422a and 422b. The same effect can be obtained by various mechanisms such as a combination of a stationary spiral projection and a movable recess to be detachably engaged with the projection or a combination of a spiral cam groove and a rod.

Further, the holding mechanism 416 is provided in the vehicle inlet 1 in this embodiment. The mechanism 416 may be provided in the supply connector 2 or both inlet 1 and connector 2.

Next, still another embodiment of the present invention will be described below. In this embodiment, as shown in FIG. 26, a second elastically deformable piece 430 is provided with an engaging piece 431, and an engaging recess 432 is provided in an inner periphery of the housing 3, whereby these elements maintain the coupling in the complete fitting state by means of their mutual engagement in lieu of the holding mechanism 416 of the above-mentioned embodiment.

Figure 27:
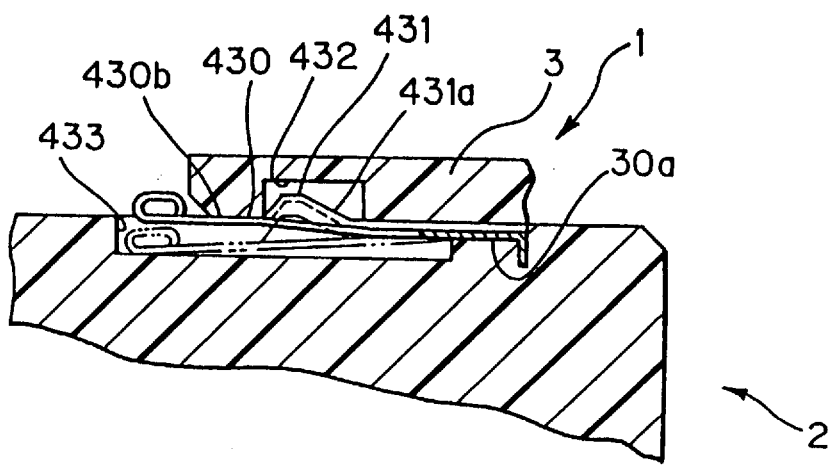
FIG. 27 is a fragmentary sectional view of the coupling shown in FIG. 26, illustrating the supply connector at the complete fitting position relative to the vehicle inlet.

As shown in FIG. 27, the second elastically deformable piece 430 is provided on the supply connector 2 symmetrically relative to the axis of the connector 2 near the piece 426. The second elastically deformable piece 430 is a cantilever type construction in which a proximal end 430a is fixed on the connector 2 and a free end 430b extends rearwardly. The second piece 430 is provided on its middle portion with an engaging piece 431 which projects from the upper face by a given height. The engaging piece 431 is provided on its front side with a guide ramp 431a. The supply connector 2 is smoothly inserted into the vehicle inlet 1 through the guide ramp 431a. The second piece 430 is provided on a lower side with an escape recess 433 in which the second piece enters when being deformed.

When the supply connector 2 is inserted into the vehicle inlet 1 to be in the half fitting state, the engaging piece 431 of the second piece 430 is pressed on an inner periphery of a guide barrel 411, whereby the second piece is deflected to enter into the escape recess 433 (shown by two dot chain lines in FIG. 27). While the supply connector 2 is turned in the direction P to reach the complete fitting position, the engaging piece 431 reaches an engaging recess 432 while moving spirally on the inner periphery of the guide barrel 411. Consequently, the engaging piece 431 engages with the recess 432 and the second piece 430 elastically recovers (shown by solid lines in FIG. 27). Thus, the coupling is held in the complete fitting state by means of engagement of the piece 431 and recess 432.

According to the above embodiment, even if there is no space enough to dispose the holding mechanism 416 of the first embodiment in the supply connector 2 or the vehicle inlet 1, that is, even if the inlet housing 3 is not sufficiently thick to accommodate the holding mechanism including the plunger balls 417 and springs 418, a combination of the engaging piece 431 of the second piece 430 and the engaging recess 432 in the inner periphery of the housing 3 can maintain the coupling in the complete fitting state.

Figure 28:
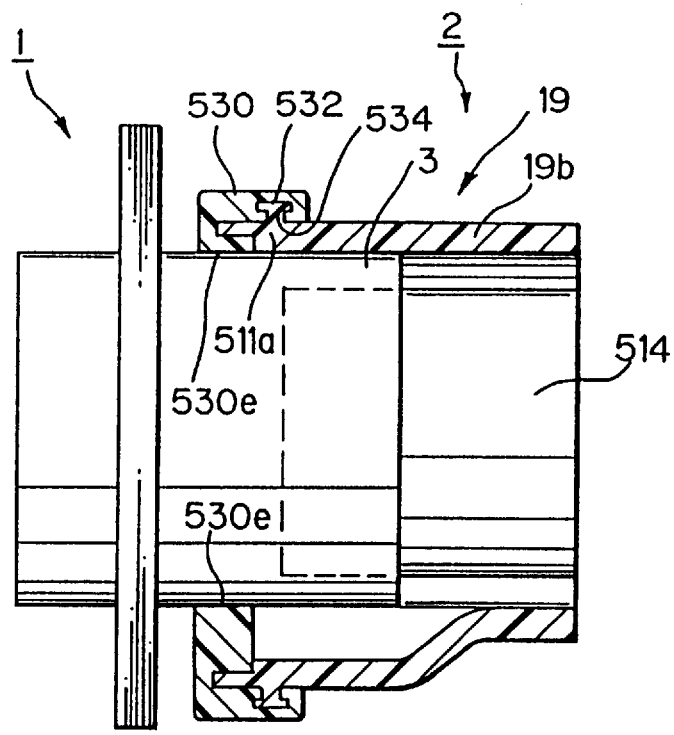
FIG. 28 is a longitudinal sectional view of another embodiment of a part of the coupling, illustrating the supply connector under a complete fitting state.
Figure 30:
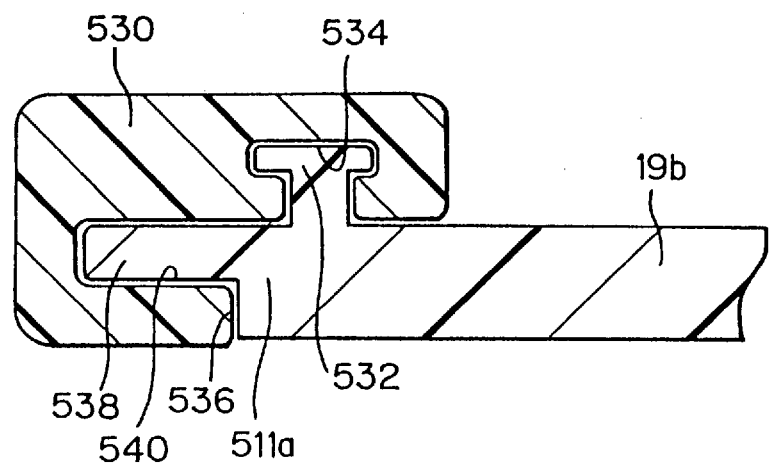
FIG. 30 is a fragmentary sectional view of the supply connector shown in FIG. 29.

A protective member for a connector end will be explained below by referring to FIGS. 28 to 30.

As shown in FIG. 29, a coupling comprises a vehicle inlet 1 and a supply connector 2. The vehicle inlet 1 includes a cylindrical metal guide or inlet housing 3 and a plate like flange provided on a rear side of the housing 3. The vehicle inlet 1 is secured to an electric vehicle not shown by fixing the flange on a vehicle body not shown. The housing 3 is provided in its interior with a male connector unit including power source terminals and a signal terminal.

On the other hand, the supply connector 2 includes a metal shell (for example, made of aluminum or the like) or outer housing 19b. The outer housing 19b is provided in its interior with a female connector unit 514 having power source terminals 512 and signal terminals 513 which correspond to the respective terminals in the vehicle inlet 1. The female connector unit 514 is connected through a cable 23 to a power source and a charging device.

A body 29 extends from a rear portion of the outer housing 19b and a grip handle 32 extends axially from a rear portion of the body 29. The grip handle 32 is used to fit the connector 2 to the inlet 1. A lever 33 is rotatably attached to a proximal end of the grip handle 32 to enable the supply connector 2 to be easily fitted to the vehicle inlet 1. The body 29 is provided on its upper face with a slide switch 42 which opens and closes a charging circuit not shown.

A ring rubber cover 530 is mounted on an outer periphery end of the outer housing 19b so that the cover 530 shields the whole end periphery of the housing 19b. As shown in FIGS. 28 and 30, the outer housing 19b is provided on an outer periphery near an distal end edge 511a with an annular ridge 532 on which the cover 530 is mounted. The annular ridge is formed into a T-shape in cross section. The rubber cover 530 is provided on its inner periphery with a groove 534 which is formed into a complementary T-shape in cross section. When the groove 534 engages with the annular ridge 532, the rubber cover 530 is secured to the outer housing 19b.

The outer housing 19b is provided in the inner periphery with an annular shoulder 536 which defines an insertion portion 538 with a thinner thickness than the housing 19b. The rubber cover 530 is provided with an annular groove 540 adapted to receive the insertion portion 538. When the insertion portion 538 is inserted into the annular groove 540, the distal end edge 511a of the outer housing 19b is shielded with the cover 530.

Next, an operation of the above embodiment will be explained below.

In the case of attaching the rubber cover 530 to the outer housing 19b of the supply connector 2, the annular groove 540 in the cover 530 fits on the insertion portion 538 of the housing 19b, and the groove 534 in the cover 530 fits on the ridge 532 of the housing 19b while the cover 530 is being extended rearwardly, thereby fixing the rubber cover 530 on the housing 19b. Consequently, the outer periphery, end edge 511a and the inner periphery of the insertion portion 538 are all shielded by the cover 530.

Next, upon connecting the supply connector 2 to the vehicle inlet 1, the outer housing 19b shielded with the cover 530 is fitted on the inlet housing 3 of the vehicle inlet 1 to push the supply connector 2 onto the vehicle inlet 1. Then, an inner periphery 530e of the rubber cover 530 and the inner periphery of the housing 19b contact with the outer periphery of the inlet housing 3 and the male connector unit not shown is coupled to the female connector unit 514. Thus, the inlet 1 and connector 2 are interconnected.

According to the above embodiment, even if the housing 19b contacts with the body by mistake when the supply connector 2 is fitted to the vehicle inlet 1 upon charging, the housing 19 does not injure the body since the cover 530 directly contacts with the body.

Even if the supply connector 2 falls on the floor by mistake, the housing 19 is not broken since the housing 19b is protected by the cover 530.

Further, since the ridge 532 on the housing 19b engages with the groove 534 in the rubber cover 530, the cover 530 is positively secured to the housing 19b without using a special fixing member such as a ring or the like. Accordingly, the construction is simplified.

Since the ridge 532 engages with the groove 534, the rubber cover can be easily attached to and detached from the housing 19b. This makes exchange or maintenance of the rubber cover easy.

The rubber cover may shield only the outer periphery and end edge of the housing 19b.

The rubber cover may be secured on the housing by means of adhesion or welding.

Figure 31:
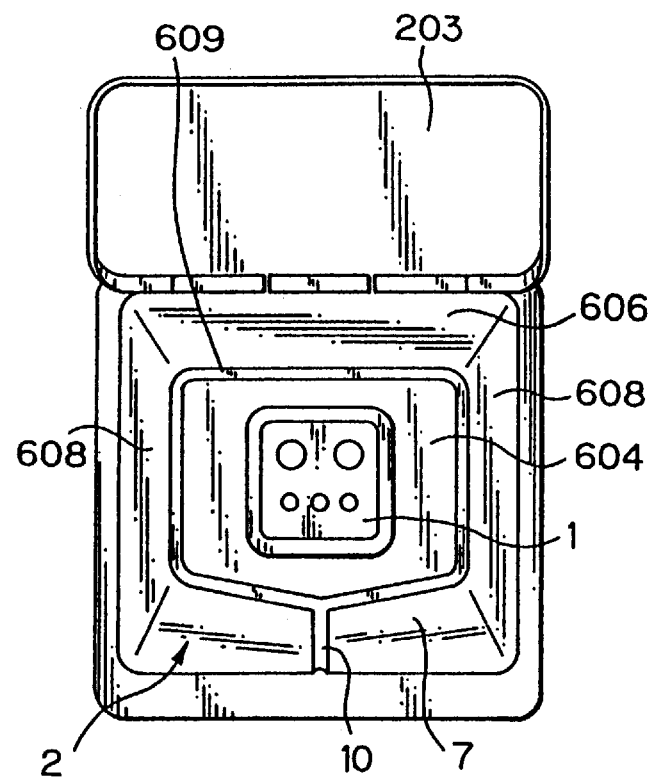
FIG. 31 is a front elevational view of an embodiment of the vehicle inlet of the charge coupling.
Figure 32:
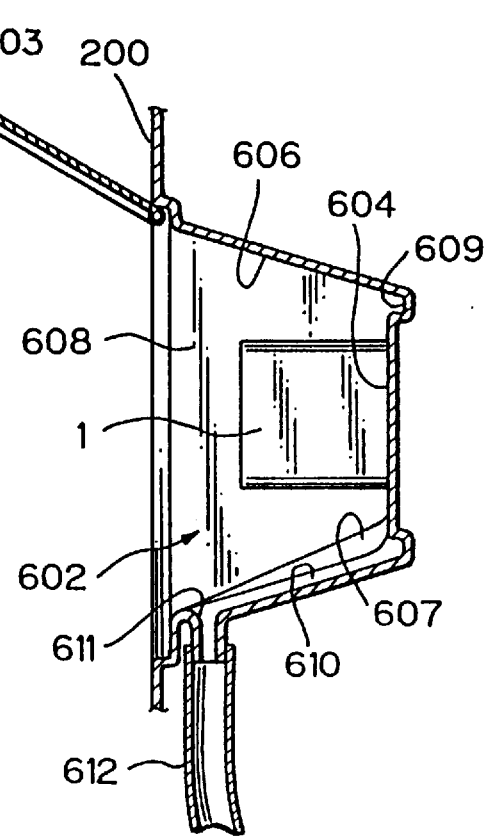
FIG. 32 is a longitudinal sectional view of FIG. 31.
Figure 33:
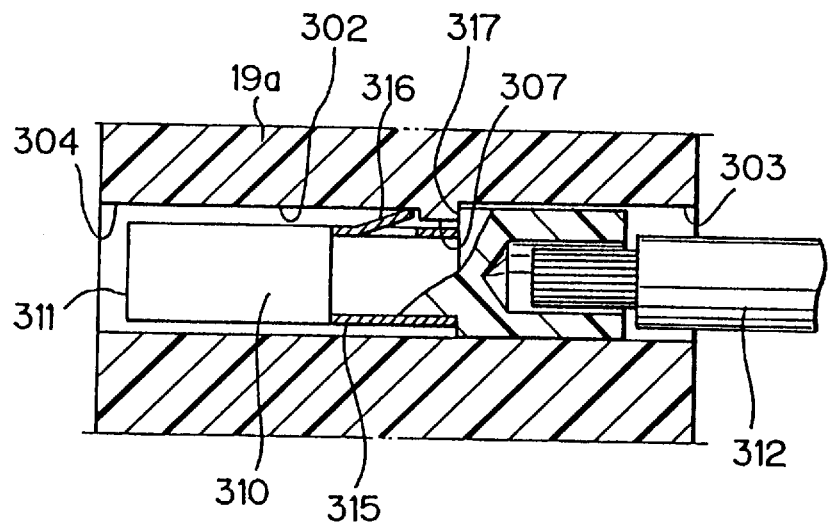
FIG. 33 is a fragmentary longitudinal sectional view of a conventional supply connector.
Figure 35:
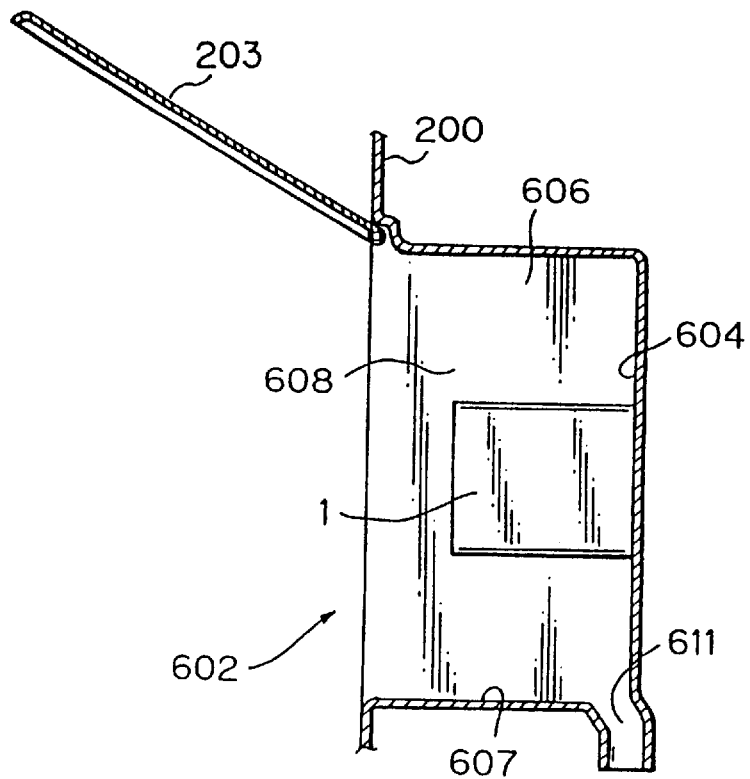
FIG. 35 is a longitudinal sectional view of a conventional vehicle inlet.

Next, an embodiment of a draining mechanism of the present invention will be explained by referring to FIGS. 31 and 32.

A body 200 of an electric vehicle is provided with a rectangular accommodating chamber 602 which is open outwardly. The chamber 602 is provided on its opening with a rocking cover 603. A vehicle inlet 1 is accommodated in the chamber 602, with the inlet projecting from a vertical inner wall 604. A supply connector not shown is connected to the vehicle inlet 1 to charge a battery not shown in the vehicle.

A ceiling wall 606 of the chamber 602 is inclined downwardly from the opening to the inner wall 604. A floor wall 607 is inclined upwardly from the opening to the inner wall 604 and downwardly from opposite side walls 608 and 608 to a central portion.

The accommodating chamber 602 is provided with water-collecting grooves 609 on the connected edge portions between the ceiling wall 606 and the inner wall 604, between the inner wall 604 and the opposite side walls 608, 608, and between the floor wall 607 and the inner wall 604. The water-collecting grooves 609 are communicated with a draining groove 610 extending in a central lower valley on the floor wall 607.

The draining groove 610 is communicated with a draining port 611 formed in the floor wall 607 near the opening of the chamber 602. A hose 612 is connected to the draining port 611 with a lower end of the hose 612 being disposed out of the body.

Preferably, a water-repelling treatment such as Teflon (trade name) coating or the like may be applied to surfaces of the inner wall 604, ceiling wall 606, floor wall 607, side walls 608, collecting grooves 609, and draining groove 610.

Further, the cover 203 attached to the opening of the accommodating chamber 602 is provided on its inner face with a heating means such as a heating wire 613.

Next, an operation of the present embodiment will be explained below.

If water adheres to the interior of the chamber 602, water on the ceiling wall 606 flows toward the inner wall 604 by means of inclination and water-repelling treatment and reaches the collecting grooves 609. The water in the grooves 609 is drained through the draining groove 610, draining port 611 and hose 612 to the outside of the chamber 602.

Water on the vertical inner wall 604 flows down by means of the water-repelling treatment and reaches the collecting grooves 609. The water in the grooves 609 is drained through the draining groove 610, draining port 611 and hose 612 to the outside of the chamber 602.

Similarly, water on the opposite side walls 608 flows down by means of the water-repelling treatment and reaches the floor wall 607. The water together with water Which adheres to the floor wall 607 initially flow down and reaches the draining groove 610. The water in the groove 610 is drained through the draining port 611 and hose 612 to the outside of the chamber 602.

Even if some water existing in the interior of the accommodating chamber 602 does not flow in the manner described above and remains in the interior, the water is vaporized and is removed from the chamber by actuating the heating means provided on the cover 203. Water on the surface of the vehicle inlet 1 is vaporized and is removed by the heating means. Accordingly, water in the chamber 2 can be completely removed therefrom.

The heating means may be omitted. In such case, only water on the upper face of the vehicle inlet 1 tends to moisten the terminals. However, such water is very small in amount and a great part of water is drained out of the chamber 602 without wetting the terminals. Accordingly, there is little danger of leakage and shortcircuiting due to wetting of the vehicle inlet 1.

The drained water does not flow on an exterior of the body 200 through the opening of the chamber 602. Accordingly, water flown out of the chamber 602 does not spoil the appearance of the vehicle body.

What is claimed is:

1. A charge coupling for conducting current from a charger to a battery of an electrical vehicle when a supply connector connected to said charger is fully fitted to a vehicle inlet provided on said electric vehicle, said coupling comprising;

a locking device for temporarily locking said supply connector to said vehicle inlet at a half fitted position, said electrical vehicle being provided on its body, with an accommodating chamber having an outward opening which exposes said vehicle inlet, said accommodating chamber being provided on its interior with a draining mechanism, including inclined walls, a cover attached to said opening of said accommodating chamber being provided with a heater for heating the interior of said chamber.

2. The charge coupling of claim 1 wherein said interior of said accommodating chamber is covered with a water repellent layer.

3. The charge coupling of claim 1 wherein said accommodating chamber is provided with a draining port, in the vicinity of an opening edge.

4. The charge coupling of claim 1 wherein said groove is adjacent said opening.

5. The charge coupling of claim 1 wherein said walls incline toward said groove.

6. The charge coupling of claim 1 wherein said chamber is defined by a ceiling wall, two depending side walls, a floor wall between lower ends of said side walls, and an inner wall, facing said opening, contiguous with said ceiling wall, said side walls, and said floor wall, said groove being adjacent a periphery of said inner wall.

7. A charge coupling for conducting current from a charger to a battery of an electrical vehicle when a supply connector connected to said charger is fully fitted to a vehicle inlet provided on said electric vehicle, said coupling comprising;

a locking device for temporarily locking said supply connector to said vehicle inlet at a half fitted position, said electrical vehicle having an accommodating chamber with an outward opening which exposes said vehicle inlet, said accommodating chamber being provided on its interior with a draining mechanism on an inner wall which faces said outward opening, at least one water collection groove on said inner wall, recessed from a plane thereof in a direction away from said opening, and in communication with an exterior of said chamber.

8. The charge coupling of claim 7 wherein said groove is adjacent said opening.

9. The charge coupling of claim 7 wherein said walls incline toward said groove.

10. The charge coupling of claim 7 wherein said chamber is defined by a ceiling wall, two depending side walls, a floor wall between lower ends of said side walls, and an inner wall, facing said opening, contiguous with said ceiling wall, said side walls, and said floor wall, said groove being adjacent a periphery of said inner wall.

11. The charge coupling of claim 7 wherein said groove is adjacent a periphery of said inner wall.

12. The charge coupling of claim 7 wherein said interior of said accommodating chamber is covered with a water repellent layer.

13. The charge coupling of claim 7 wherein said accommodating chamber is provided with a draining port, in the vicinity of an opening edge.

* * * * *